US011488113B1

(12) United States Patent
Schemers et al.

(10) Patent No.: US 11,488,113 B1
(45) Date of Patent: Nov. 1, 2022

(54) RENDERING RELATED CONTENT PRIOR TO AN EVENT IN A GROUP-BASED COMMUNICATION INTERFACE

(71) Applicant: Slack Technologies, Inc., San Francisco, CA (US)

(72) Inventors: Roland Schemers, Woodside, CA (US); James McPhail, San Francisco, CA (US); Lydia Han, San Francisco, CA (US)

(73) Assignee: Slack Technologies, LLC, San Francisco, CA (US)

( * ) Notice: Subject to any disclaimer, the term of this patent is extended or adjusted under 35 U.S.C. 154(b) by 267 days.

(21) Appl. No.: 16/263,781

(22) Filed: Jan. 31, 2019

(51) Int. Cl.
*G06Q 10/06* (2012.01)
*G06Q 10/10* (2012.01)
*H04L 12/18* (2006.01)

(52) U.S. Cl.
CPC ..... *G06Q 10/1095* (2013.01); *H04L 12/1818* (2013.01); *H04L 12/1831* (2013.01)

(58) Field of Classification Search
CPC ................................ G06Q 10/06; G06Q 10/10
USPC ........................................................ 705/7.19
See application file for complete search history.

(56) References Cited

U.S. PATENT DOCUMENTS

| 2010/0010864 | A1* | 1/2010 | Lee | G06Q 10/109 |
| | | | | 705/7.18 |
| 2011/0137700 | A1* | 6/2011 | Hamalainen | G06Q 10/109 |
| | | | | 705/7.18 |
| 2012/0084286 | A1* | 4/2012 | Hubner | G06Q 10/1093 |
| | | | | 707/737 |
| 2014/0358632 | A1* | 12/2014 | Graff | G06Q 30/0224 |
| | | | | 705/7.29 |
| 2014/0372162 | A1* | 12/2014 | Dhara | G06Q 10/1095 |
| | | | | 705/7.19 |
| 2015/0019273 | A1* | 1/2015 | Grosz | G06Q 50/01 |
| | | | | 705/5 |
| 2015/0058057 | A1* | 2/2015 | Egan | G06Q 10/1095 |
| | | | | 705/7.19 |
| 2015/0088784 | A1* | 3/2015 | Dhara | G06N 5/02 |
| | | | | 706/11 |
| 2015/0100503 | A1* | 4/2015 | Lobo | G06Q 10/103 |
| | | | | 705/301 |
| 2015/0149544 | A1* | 5/2015 | Zhang | G06Q 10/109 |
| | | | | 709/204 |
| 2016/0140508 | A1* | 5/2016 | Ossia | G06Q 10/1095 |
| | | | | 705/7.19 |
| 2017/0039527 | A1* | 2/2017 | Rangan | G06Q 10/1095 |
| 2017/0093967 | A1* | 3/2017 | Grosz | H04L 51/32 |
| 2017/0116581 | A1* | 4/2017 | Shah | G06Q 10/1097 |

(Continued)

OTHER PUBLICATIONS

U.S. Application filed Dec. 22, 2017, In re: Greene et al. entitled System, Apparatus, and Computer Program Product for Generating a Group-Based Communication Interface Having Improved Panes Positioned in a Defined Display Window, U.S. Appl. No. 15/853,376.

(Continued)

*Primary Examiner* — Nga B Nguyen
(74) *Attorney, Agent, or Firm* — Erise IP, P.A.

(57) ABSTRACT

Provided are methods and apparatuses configured to programmatically generate and provide calendar digests of relevant group-based communication content to a client device associated with one or more event occurrence data structures.

20 Claims, 12 Drawing Sheets

(56) References Cited

U.S. PATENT DOCUMENTS

2018/0287982 A1   10/2018   Draeger et al.

OTHER PUBLICATIONS

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 27 pages.

Robert Hof, "Stewart Butterfield on How Slack Became a $2.8 Billion Unicorn", Forbes, [online][retrieved May 9, 2019], Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 3 pages.

Rebecca Walberg, "Email biggest office waste of time: survey", National Post, at FP10, LexisNexis, https://advance.lexis.com/api/permalink/96268e3f-26ad-48ac-a98f-6c39804ebded/?context=1000516, (dated Mar. 4, 2014) 2 pages.

Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 66 pages.

Mike Issac, "Slack, a Start-Up With an App to Foster Business Collaboration, Is Valued at $1.1 Billion", The New York Times Blogs (BITS), LexisNexis, https://advance.lexis.com/api/permalink/3eb84b34-a8f9-4d7d-9573-89d9598a4963/?content=1000516>. (dated Oct. 31, 2014) 2 pages.

Michael Carney, "Slack is thriving on a cocktail of whimsy and great timing", PandoDaily, LexisNexis, https://advance.lexis.com/api/permalink/dd2d4ee5-2ddf-4d3a-a1d9-3bcee5e38b74/?context=1000516, (dated Feb. 6, 2015, 2:12 AM) 3 pages.

Matthew Ingram, "Flickr co-founder launches Slack, an all-in-one messaging tool designed to kill email forever", GIGAOM, LexisNexis, https://advance.lexis.com/api/permalink/0b676b7c-aec3-4560-861e-d030d1dd008c/?context=1000516, (dated Feb. 12, 2014, 7:03 PM), 2 pages.

Jonathan Vanian, "Why these startups think chat apps are the next big thing in workplace collaboration", GIGAOM, LexisNexis, https://advance.lexis.com/api/permalink/e83778c8-09c8-43aa-9ba0-88526283de69/?context=1000516, (dated Aug. 1, 2014, 5:45 PM) 4 pages.

Internet Relay Chat, Wikipedia, , [online][retrieved May 30, 2019]. Retrieved from the Internet: <URL: https://en.wikipedia.org/wiki/Internet_Relay_Chat>. (dated May 28, 2019) 17 pages.

Ernie Smith, "Picking Up the Slack", Tedium, [online][retrieved May 9, 2019], Retrieved from the Internet: <URL: https://tedium.co/2017/10/17/irc-vs-slack-chat-history/>. (dated Oct. 17, 2017) 8 pages.

David Auerbach, "Re-Animator. How Stewart Butterfield created Flickr and Slack out of the ashes of failed projects" [online][retrieved May 9, 2019]. Retrieved from the Internet: <URL: https://slate.eom/business/2014/05/stewart-butterfield-flickr-and-slack-how-he-snatched-victory-from-the-jaws-of-defeat.html>. (dated May 28, 2014, 2:48 PM) 8 pages.

Adrienne LaFrance, "The Triumph of Email", Atlantic Online, LexisNexis, https://advance.lexis.com/api/permalink/32d7ddd9-d4c1-4a73-86f7-08ab5842fde6/?context=1000516, (dated Jan. 6, 2016) 5 pages.

"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 13 pages.

"Die, Email, Die! A Flickr Cofounder Aims to Cut Us All Some Slack", ReadWriteWeb, LexisNexis, https://advance.lexis.com/api/permalink/33dd79e2-90f5-409d-ae27-5a2c7e86bf31/?context=1000516>. (dated Aug. 14, 2013, 4:15 PM) 2 pages.

Matsumoto, T. et al., "Chocoa Communicator—A New Communication System Based on Awareness and Text Communications—", Fujitsu Sci. Tech. J., 36, 2, (Dec. 2000) 154-161.

* cited by examiner

RENDERING RELATED CONTENT PRIOR TO AN EVENT IN A GROUP-BASED COMMUNICATION INTERFACE

BACKGROUND

Various systems are available that allow users to create electronic calendars for managing events and tasks. Applicant has identified a number of deficiencies and problems associated with conventional electronic calendars. Through applied effort, ingenuity, and innovation, many of these identified problems have been solved by developing solutions that are included in embodiments of the present invention, many examples of which are described in detail herein.

BRIEF SUMMARY

In general, embodiments of the present invention provided herein include methods, apparatus, and computer program products for intelligently analyzing event occurrence data structures to curate a collection of relevant content in a group-based communication platform.

For example, the methods, apparatuses, and computer program product may be configured to programmatically generate and transmit group-based communication calendar digests to a user device associated with one or more event occurrence data structures within a group-based communication system. Embodiments provided herein include an apparatus for programmatically generating and transmitting group-based communication calendar digests to a user device associated with one or more event occurrence data structures within a group-based communication system, the apparatus including at least one processor and at least one memory including computer program code for one or more programs, the at least one memory and the computer program code configured to, with the at least one processor, cause the apparatus to receive an event occurrence data structure from a third party event scheduling resource. In embodiments, the event occurrence data structure is associated with an event occurrence identifier and an event occurrence start time identifier.

In embodiments, the apparatus including at least one processor and at least one memory including computer program code for one or more programs, the at least one memory and the computer program code configured to, with the at least one processor, cause the apparatus to extract one or more event occurrence parameters from the event occurrence data structure.

In embodiments, the apparatus including at least one processor and at least one memory including computer program code for one or more programs, the at least one memory and the computer program code configured to, with the at least one processor, cause the apparatus to, based on the one or more event occurrence parameters, determine one or more conversation topics and one or more content topics associated with the event occurrence identifier.

In embodiments, the apparatus including at least one processor and at least one memory including computer program code for one or more programs, the at least one memory and the computer program code configured to, with the at least one processor, cause the apparatus to retrieve, from a group-based communication repository, one or more group-based communication data objects associated with one or more of the one or more conversation topics and the one or more content topics.

In embodiments, the apparatus including at least one processor and at least one memory including computer program code for one or more programs, the at least one memory and the computer program code configured to, with the at least one processor, cause the apparatus to aggregate one or more of the one or more group-based communication data objects into an electronic group-based communication calendar digest.

In embodiments, the apparatus including at least one processor and at least one memory including computer program code for one or more programs, the at least one memory and the computer program code configured to, with the at least one processor, cause the apparatus to and transmit the electronic group-based communication calendar digest to a client device associated with the event occurrence data structure. The electronic group-based communication calendar digest may be renderable for display within a group-based communication interface. The electronic group-based communication calendar digest may be transmitted to the client device prior to a network time associated with the event occurrence start time identifier.

In some embodiments, the client device associated with the event occurrence data structure may be a client device associated with the event occurrence creator identifier or an event occurrence invitee identifier.

In some embodiments, the at least one memory and the computer program code may be further configured to, with the at least one processor, cause the apparatus to calculate a relevance score of each of the one or more group-based communication data objects associated with one or more of the one or more conversation topics and the one or more content topics, select and order the one or more group-based communication data objects associated with one or more of the one or more conversation topics and the one or more content topics based on the calculated relevance score, and filter the one or more group-based communication data objects associated with one or more of the one or more conversation topics and the one or more content topics to remove one or more group-based communication data objects associated with one or more of the one or more conversation topics and the one or more content topics not meeting a threshold relevance score.

In some embodiments, the electronic group-based communication calendar digest may be transmitted to the client device associated with the event occurrence data structure is an electronic group-based communication calendar digest summary. In some embodiments, the at least one memory and the computer program code may be further configured to, with the at least one processor, cause the apparatus to perform at least the following: receive a digest detail request, and in response to receipt of the digest detail request, generate and transmit an electronic group-based communication calendar digest detail.

In some embodiments, the event occurrence parameters may further comprise an event occurrence title, event occurrence timestamp, event occurrence invitee identifier, or combinations thereof.

In some embodiments, the event occurrence data structure may be associated with a group-based communication system and comprises a group-based communication channel identifier, thread identifier, group identifier, or combinations thereof.

In some embodiments, the at least one memory and the computer program code may be further configured to, with the at least one processor, cause the apparatus to receive a digest request associated with the event occurrence data structure along with receiving the event occurrence data structure, the digest request indicating a time period for transmitting the electronic group-based communication calendar digest. In some embodiments, the electronic group-based communication calendar digest may be transmitted to the client device at a predetermined time prior to the network time associated with the event occurrence start time identifier.

In some embodiments, the digest request may be configured to cause the apparatus to periodically identify a plurality of event occurrence data structures from the third party event scheduling resource, extract one or more event occurrence parameters from each event occurrence data structure of the plurality of event occurrence data structures, based on the one or more event occurrence parameters, determine one or more conversation topics and one or more content topics associated with each event occurrence identifier associated with each event occurrence data structure of the plurality of event occurrence data structures, retrieve, from a group-based communication repository, one or more group-based communication data objects associated with one or more of the one or more conversation topics and the one or more content topics, aggregate one or more of the one or more group-based communication data objects into an electronic group-based communication calendar digest associated with each event occurrence data structure of the plurality of event occurrence data structures, and transmit the electronic group-based communication calendar digests to the client device associated with the event occurrence data structure.

In some embodiments, the at least one memory and the computer program code may be further configured to, with the at least one processor, further cause the apparatus to retrieve, from a third party event scheduling resource, one or more data objects from the third party event scheduling resource associated with one or more of the one or more conversation topics and the one or more content topics; and add the one or more data objects to the electronic group-based communication calendar digest.

In some embodiments, the group-based communication data objects may include a file, a group-based communication channel, a thread, a communication message, a user identifier, a second event occurrence data structure, an email, or combinations thereof. In some embodiments, the one or more data objects from the third party event scheduling resource may include a file, a second event occurrence data structure, an email, or combinations thereof. In some embodiments, the at least one memory and the computer program code may be further configured to, with the at least one processor, further cause the apparatus to receive a save request in response to transmitting the electronic group-based communication calendar digest to the client device, and in response to receiving the save request, associate at least a portion of the electronic group-based communication calendar digest to the event occurrence data structure in the surfacing content database.

In some embodiments, the at least one memory and the computer program code may be further configured to, with the at least one processor, further cause the apparatus to receive a remove request in response to transmitting the electronic group-based communication calendar digest to the client device, and in response to receiving the remove request, remove at least a portion of the electronic group-based communication calendar digest from the electronic group-based communication calendar digest, transmit the electronic group-based communication calendar without the portion of the electronic group-based communication calendar digest, or combinations thereof.

In some embodiments, the at least one memory and the computer program code may be further configured to, with the at least one processor, further cause the apparatus to receive an add request in response to transmitting the electronic group-based communication calendar digest to the client device; and in response to receiving the add request, add one or more data objects to the electronic group-based communication calendar digest based on the add request and transmit the electronic group-based communication calendar digest with the added one or more data objects.

In some embodiments, the electronic group-based communication calendar digest may be renderable for display within a group-based communication channel of the group-based communication interface. In some embodiments, the electronic group-based communication calendar digest may be renderable for display within a thread of the group-based communication interface.

In some embodiments, the one or more of the one or more group-based communication data objects in the electronic group-based communication calendar digest may be displayed as one or more user engageable links associated with each of the one or more of the one or more group-based communication data objects to provide access to relevant information regarding each associated group-based communication data object. In some embodiments, at least one of the one or more user engageable links may be configured to cause the display of a file, a group-based communication channel, a thread, a communication message, a second event occurrence data structure, an email, or combinations thereof.

BRIEF DESCRIPTION OF THE FIGURES

Reference will now be made to the accompanying drawings, which are not necessarily drawn to scale, and wherein.

DETAILED DESCRIPTION

Figure 1:
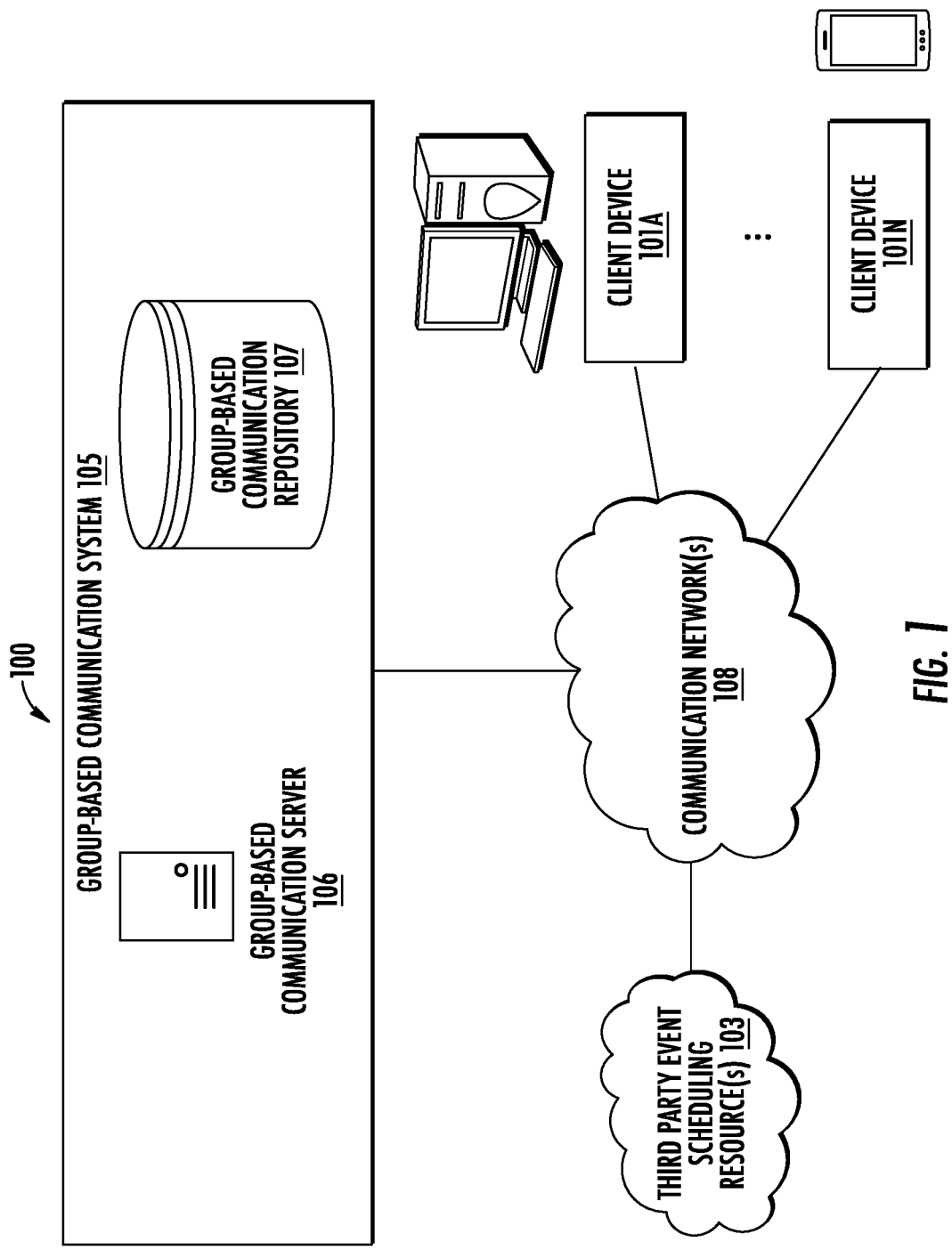
FIG. 1 illustrates an example group-based communication system in accordance with some embodiments discussed herein.

Some embodiments of the present invention will now be described more fully hereinafter with reference to the accompanying drawings, in which some, but not all embodiments of the inventions are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Terms

As used herein, the terms "data," "content," "digital content," "digital content object," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be transmitted directly to another computing device or may be transmitted indirectly via one or more intermediary computing devices, such as, for example, one or more servers, relays, routers, network access points, base stations, hosts, and/or the like.

The term "file" refers to a packet of data treated as a unit, such as a web page (e.g., .htm, .html, etc.), pdf (e.g., .pdf), graphic or photo (e.g., .jpg, .jpeg, etc.), Microsoft Word document (e.g., .doc, .docx, etc.), Microsoft Excel file (e.g., .xls, .xlsx, .xlsm, .xlsb, etc.), Box file, Dropbox file, Google Drive file, etc. and may store pictures, words, videos, computer programs, and combinations thereof. The files may be uploaded to the group-based communication interface or may be cloud or remotely stored files (e.g., Google-Doc, GitHub, etc.) and app session pointers. That is, the files may be stored to a memory or database associated with the group-based communication system and/or may be stored to a memory or database associated with a third party event scheduling resource (e.g., a software program, application, platform, service, etc. that is configured to communicate with the group-based communication system for providing service to a client device via a group-based communication interface). In some embodiments, the file may be stored to a remove data object address, which may be a uniform resource locator (URL), an internet address, or an intranet domain.

The term "file identifier" refers to one or more items of data by which a file may be identified. For example, a file identifier may comprise ASCII text, a pointer, a memory address, and the like.

The term "client device" refers to computer hardware and/or software that is configured to access a service made available by a server. The server is often (but not always) on another computer system, in which case the client device accesses the service by way of a network. Client devices may include, without limitation, smart phones, tablet computers, laptop computers, wearables, personal computers, enterprise computers, and the like.

"Group-based" is used herein to refer to a system, channel, message, or virtual environment that has security sufficient such that it is accessible only to a defined group of users. The group may be defined by common access credentials such as those of an organization or commercial enterprise. Access may further be facilitated by a validated request to join or an invitation to join transmitted by one group member user to another non-member user. Group identifiers (defined below) are used to associate data, information, messages, etc., with specific groups.

The term "group-based communication interface" refers to a virtual communications environment configured to facilitate user interaction with a group-based communications system. Each group-based communication interface is accessible and viewable to a select group of users, such as a group of employees of a business or organization (e.g., the Slack Corp. interface would be accessible and viewable to the Slack employees however the ACME Corporation group-based communication interface would not be accessible and viewable to Slack employees). The group-based communication interface includes a plurality of group-based communication channels (e.g., a marketing channel, sales channel, accounting channel, etc.), which are defined herein.

A group-based communication interface is a user interface of the group-based communication system and has security sufficient such that it is accessible only to a defined group of users. As discussed herein, access may be facilitated by a group-based communication interface invitation to join transmitted by one group member user to another non-member user. As used herein, a "group-based communication interface account" is a designation to which messages may be delivered in the group-based communication system and associated with the respective group-based communication interface. The group-based communication interface account may have an identifier, referred to as a group-based communication identifier, which identifies the group-based communication interface account and may comprise ASCII text, a pointer, a memory address, and the like. For instance, the group-based communication interface identifier may be an email address (e.g., comprising a local-part, an @ symbol, then a case-insensitive domain).

As used herein, the term "group-based communication channel" refers to a virtual communications environment or feed that is configured to display Communication messages posted by channel members (e.g., validated users accessing the environment using client devices) that are viewable only to the members of the group. The format of the group-based communication channel may appear differently to different users of the group-based communication channel; however, the content of the group-based communication channel (i.e., Communication messages) will be displayed to each member of the group-based communication channel. For instance, a common set of group-based Communication messages will be displayed to each member of the respective group-based communication channel such that the content of the group-based communication channel (i.e., Communication messages) will not vary per member of the group-based communication channel.

The format of the group-based communication channel may appear differently to different members of the group-based communication channel; however, the content of the group-based communication channel (i.e., Communication messages) may be displayed to each member of the group-based communication channel. For instance, in one embodiment, a common set of group-based Communication messages will be displayed to each member of the respective group-based communication channel such that the content of the group-based communication channel (i.e., Communication messages) will not vary per member of the channel. However, in another embodiment, a member may join a group-based communication channel and only be able to view subsequent group-based Communication messages (as opposed to historical group-based Communication messages). The group-based communication channels are generally topic-oriented, long-lasting channels as opposed to ad hoc ephemeral conversations in conventional messaging apps.

A "thread" is a collection of communication messages displayed to a subsidiary feed arising from or otherwise associated with a selected group-based Communication message displayed in a selected group-based communication channel. A thread may include one or more "threaded messages" or "thread communication messages" that are linked together in the subsidiary feed, wherein each is associated with the selected group-based Communication message. In some embodiments, a file thread request may be received. The file thread request may request the creation of a file thread. The file thread request may include a thread communication message or may initiate a thread in which a thread communication message is then received. A "file thread" refers to a thread created from the sharing of a file (generally referred to as a "file share"). A single file may be shared multiple times with each instance of sharing being referred to as a unique file share. Each file share is initiated by a unique file share request and leads to the generation and display of a unique file summary avatar and which may be presented with an introductory Communication message unique to the file share request.

A "direct message" is a collection of communication messages between two users of the group-based communication system.

The term "user" should be understood to refer to an individual, group of individuals, business, organization, and the like; the users referred to herein are accessing a group-based communication or messaging system using client devices.

The terms "group-based communication channel identifier" or "channel identifier" refer to one or more items of data by which a group-based communication channel may be uniquely identified. For example, a group-based communication channel identifier may comprise ASCII text, a pointer, a memory address, and the like.

The terms "group identifier" or "team identifier" refer to one or more items of data by which a group within a group-based communication system may be uniquely identified. For example, a group identifier may comprise ASCII text, a pointer, a memory address, and the like.

As used herein, the term "group-based communication message" refers to any electronically generated digital content object provided by a user that has security sufficient such that it is accessible only to a defined group of users and that is configured for display within a group-based communication channel. Communication messages may include any text, image, video, audio, or combination thereof provided by a user (using a client device). For instance, the user may provide a communication message that includes text as well as an image and a video within the communication message as message contents. In such a case, the text, image, and video would comprise the communication message or digital content object. Each message sent or posted to a group-based communication channel of the group-based communication system includes metadata comprising the following: a timestamp associated with post of the message, a sending user identifier, a message identifier, message contents, a group identifier, a group-based communication channel identifier, a thread identifier, and the like. Each of the foregoing identifiers may comprise ASCII text, a pointer, a memory address, and the like.

As used herein, "request" refers to an instruction or direction, generally initiated by a client device associated with user, for an action to take place. For instance, a user may request to create a thread (e.g., thread request), view a summary of threads the user follows (e.g., thread summary view request), view profile data of another user, view certain Communication message information, share a select thread communication message from a thread to the selected group-based communication channel from which the thread was created (e.g., broadcast request), receive notifications regarding a thread (e.g., follow request), notify a selected member of a thread communication message (e.g., follow request), share a file (e.g., file share request), reply to a shared file (e.g., file thread request), edit an introductory message to a shared file (e.g., introductory Communication message edit request), view information regarding each instance a file was shared (e.g., file detail request), delete a shared file (e.g., file share delete request), change the information regarding a file (e.g., file update request), view specific instances where a file was shared (e.g., selected file thread view request), view a selected group-based communication feed request (e.g., group-based communication feed request, or more specifically selected channel view request, selected thread view request), etc.

A "sending user identifier" is associated with a collection of messages that are transmitted by a particular user (i.e., a client device associated with the particular user) intended for posting within a group-based communication system (defined below). These messages may be analyzed to determine context regarding the user (e.g., the user's expertise or interest in a topic may be determined based on the frequency of mention of the topic or key words associated with the topic within such messages).

Group-based communication system users are organized into organization groups (e.g., employees of each company may be a separate organization group) and each organization group may have one or more group-based communication channels (explained below) to which users may be assigned or which the users may join (e.g., group-based communication channels may represent departments, geographic locations such as offices, product lines, user interests, topics, issues, and/or the like). A group identifier may be used to facilitate access control for a message (e.g., access to the message, such as having the message return as part of search results in response to a search query, may be restricted to those users having the group identifier associated with their user profile). The group identifier may be used to determine context for the message (e.g., a description of the group, such as the name of an organization and/or a brief description of the organization, may be associated with the group identifier).

Group-based communication system users may join group-based communication channels. Some group-based communication channels may be globally accessible to those users having a particular organizational group identifier associated with their user profile (i.e., users who are members of the organization). Access to some group-based communication channels may be restricted to members of specified groups, whereby the group-based communication channels are accessible to those users having a particular group identifier associated with their user profile. The group-based communication channel identifier may be used to facilitate access control for a message (e.g., access to the message, such as having the message return as part of search results in response to a search query, may be restricted to those users having the group-based communication channel identifier associated with their user profile, or who have the ability to join the group-based communication channel). The group-based communication channel identifier may be used to determine context for the message (e.g., a description of the group-based communication channel, such as a description of a project discussed in the group-based communication channel, may be associated with the group-based communication channel identifier).

The term "private group-based communication channel" refers to a group-based communication channel with restricted access such that it is not generally accessible and/or searchable by other members of the group-based communication system. For example, only those users or administrators who have knowledge of and permission to access (e.g., a group-based communication channel identifier for the private group-based communication channel is associated with their user profile after the user has been validated/authenticated) the private group-based communication channel may view content of the private group-based communication channel.

"Communication message information" refers to any information associated with the communication message, such as information related to the user who created the communication message, the group-based communication channel on which the communication message was first provided (e.g., the name of the group-based communication channel), the time and date that the communication message was first provided, subsequent reproductions of the communication message (e.g., date, time, name of the receiver channel, etc. of such reproduction), and any other identifying information related to the communication message.

The terms "event occurrence" or "event" refers to a collection of data and instructions that represent an item or resource of a third party event scheduling resource. Each event occurrence is associated with an event occurrence identifier that uniquely identifies a particular event occurrence created within the third party event scheduling resource. An event occurrence may be associated with an event occurrence data structure comprising a plurality of event occurrence parameters, including the event occurrence identifier. Each event occurrence parameter may be one of an event occurrence timestamp, an event occurrence event occurrence location identifier, an event occurrence start time identifier, an event occurrence run time identifier, an event completion indicator, an event occurrence creator identifier, an event occurrence invite identifier, an event occurrence acceptance identifier, an event occurrence decline identifier, an event occurrence invitee identifier, and event occurrence title. In embodiments, an event occurrence is an electronic representation of a live in-person event during which one or more attendees gather or collaborate for a particular duration of time. In various embodiments, the live in-person event occurs at one or more physical locations and/or involves audio and/or video connections for said collaboration.

The term "event occurrence identifier" refers to one or more items of data by which an event occurrence may be uniquely identified. For example, an event occurrence identifier may comprise ASCII text, a pointer, a memory address, and the like.

The term "third party event scheduling resource" refers to a third party scheduling application provided by way of a remote networked device, such as a server or processing device, maintained by a third party individual, company, or organization. A client device in a group-based communication system may access a third party application provided by the third party event scheduling resource to execute functions, flows, or actions associated with an event occurrence. In some embodiments, the functions, flows, or actions take effect within the third party event scheduling resource to produce an effect within the third party event scheduling resource. In other embodiments, the functions, flows, or actions produce effects within various combinations of the group-based communication system, the third party event scheduling resource, and other servers or systems. In various embodiments, a group-based communication server may interact with a third party event scheduling resource to retrieve historical attendance data associated with each event occurrence invitee identifier associated with an event occurrence identifier. In various embodiments, a group-based communication server may interact with a third party event scheduling resource to retrieve an event occurrence data structure associated with an event occurrence. In various embodiments, a group-based communication server may interact with a third party event scheduling resource to retrieve an email associated with an event occurrence data structure. In various embodiments, the event occurrence data structure may be associated with one or more group-based communication channel identifiers.

The term "event occurrence data structure" refers to a collection of data associated with an event occurrence capable of being transmitted, received, and/or stored. In various embodiments, the event occurrence data structure may comprise a plurality of event occurrence parameters. In various embodiments, the event occurrence data structure may be associated with one or more group-based communication channel identifiers.

The event occurrence data structure may be organized among a plurality of event occurrence data structures to form an electronic calendar or schedule. The electronic calendar may be shared among client devices or particular to a select client device. The event occurrence data structure may be generated by and transmitted from a third party event scheduling resource to a group-based communication system. Data may be extracted, parsed, or otherwise identified from event occurrence data structures from third party event scheduling resources and used by the group-based communication system to create electronic group-based communication calendar digest.

The term "event occurrence parameter" refers to a collection of data that defines one or more aspects of an event occurrence. In various embodiments, an event occurrence parameter may be one of an event occurrence identifier, an event occurrence creator identifier, an event occurrence timestamp, an event occurrence event occurrence location identifier, an event occurrence start time identifier, an event occurrence run time identifier, an event completion indicator, an event occurrence invitee identifier, an event occurrence invitation acceptance identifier, an event occurrence invitation decline identifier, or event occurrence attendee identifier, or an event occurrence title.

The term "event occurrence title" refers to an event occurrence creator designated title associated with an event occurrence. In various embodiments, the event occurrence title may be representative of a purpose or topic associated with the event occurrence. In various embodiments, the event occurrence title may be analyzed to determine its relation to a conversation topic or a content topic for the purposes of detecting conversations and content associated with an event occurrence. For example, the event occurrence title may comprise one or more strings of text or other characters (e.g., emojis).

The term "event occurrence creator identifier" refers to one or more items of data by which an event occurrence creator that creates an event occurrence using a third party event scheduling resource may be uniquely identified. For example an event occurrence creator identifier may comprise ASCII text, a pointer, a memory address, and the like. In various embodiments, the event occurrence creator identifier may be associated with a client device and a user profile within a group-based communication system.

The term "event occurrence invitee identifier" refers to one or more items of data by which an event occurrence invitee may be uniquely identified. An event occurrence invitee identifier may be associated with a user who receives an invitation to participate in an event occurrence and has the option to either accept or decline the invitation. For example an event occurrence invitee identifier may comprise ASCII text, a pointer, a memory address, and the like. In various embodiments, the event occurrence invitee identifier may be an event occurrence parameter.

The term "event occurrence timestamp" refers to a digital representation of network time associated with at least one of the receipt, commencement, conclusion or run time of an event occurrence. The event occurrence timestamp may comprise a digital representation of one or more of the network time at which the event occurrence was created by the event occurrence creator, the network time at which the event occurrence was scheduled to begin, the network time at which the event was scheduled to end, the network time at which the event occurrence actually began, the network time at which the event occurrence actually ended, and the actual event occurrence run time. The timestamp may be analyzed to determine context regarding the event occurrence (e.g., the exact moment at which the event occurrence concluded and the proximity of that moment to the group-based communication message timestamp of a group-based communication message that was sent in a group-based communication channel). The event occurrence timestamp may be associated with an event occurrence identifier. The timestamp may be analyzed to determine context regarding the event (e.g., the exact moment at which the event started and/or ended, as well as the corresponding event run time). In various embodiments, the event timestamp may be an event occurrence parameter.

As used herein, the term "graphical identifier" refers to any visual icon, avatar, image, video, photo, or graphic that may be used to label, tag, or otherwise distinguish a selected Communication message. In some embodiments, the graphical identifier may provide a visual illustration of a sentiment or emotion that a user may wish to associate with a selected Communication message. For instance, the graphical identifier may be an emoji or an emoticon or other similar expressive visual identification means. In some embodiments, the graphical identifier may be animated, such as to illustrate movement between a first state and a second state when displayed within the selected group-based communication interface. For instance, the graphical identifier may be a series of images of a gavel that when run in sequence illustrate the movement of a gavel knocking against a desk. The animated gavel may then be used in communication messages that include final decisions as an indicator that such a decision was made.

As used herein, "channeling association" in the context of a graphical identifier and a receiver channel refers to the relationship or correlation of the graphical identifier to the receiver channel. A user can establish a channeling association between a graphical identifier and a receiver channel, cancel a channeling association between a graphical identifier and a receiver channel, and re-establish a channeling association between a graphical identifier and a receiver channel. When re-establishing a channeling association, the group-based communication interface may only associate the respective graphical identifier with the applicable receiver channel for future correlation indications. The channeling association may be made using a variety of user commands such as that depicted below:

As used herein, "correlation indication" refers to the instructions or signals received that indicate the communication message has been tied to a graphic identifier.

The terms "user profile," "user account," and "user account details" refer to information associated with a user, including, for example, a user identifier, one or more group-based communication channel identifiers associated with group-based communication channels that the user has been granted access to, one or more group identifiers for groups with which the user is associated, an indication as to whether the user is an owner of any group-based communication channels, an indication as to whether the user has any group-based communication channel restrictions, a plurality of messages, a plurality of emojis, a plurality of conversations, a plurality of conversation topics, an avatar, an email address, a real name (e.g., John Doe), a username (e.g., jdoe), a password, a real name, a time zone, a status, user interest indicators, and the like. The user account details can include a subset designation of user credentials, such as, for example, login information for the user including the user's username and password. For example, and without limitation, a user identifier may include a unique graphical identifier (e.g., an avatar), an IP address, a MAC address, and the like.

The third party event scheduling resource may be configured to provide electronic mail ("email") services to users operating client devices. The third party event scheduling resource may include an email client, a simple mail transfer protocol ("SMTP") server, and a domain name server ("DNS"). The third party event scheduling resource may be configured to allow a sending user ("a sender") to create and transmit an email message to a receiving user ("a recipient"). Each email message comprises an email envelope that defines its electronic format, an email header that includes sender/recipient information (e.g., third party event scheduling resource sender and recipient identifier) and an email subject line, and an email body that includes text, images, and file attachments. Example third party event scheduling resources include Microsoft Office 365®, Gmail®, Facebook®, and Yahoo Mail®.

An email client of the third party event scheduling resource may be used by a sender to create and transmit an email message. The email message text and attachments are thus uploaded to the SMTP server as outgoing mail. A copy of the email message is stored to an email outbox associated with the sender for later retrieval. The SMTP server communicates with the DNS to find a recipient email server using recipient information drawn from the email header.

Once the SMTP server finds the recipient email server, it transfers the email message to the recipient email server. The next time the recipient accesses the email client, the email client downloads the email message from the recipient email server for presentation to the recipient in an email inbox interface.

The term "third party event scheduling resource user identifier" refers to one or more items of data by which a user (or user profile) of third party event scheduling resource may be identified by a group-based communication system. For example, a third party event scheduling resource user identifier may comprise American Standard Code for Information Interchange (ASCII) text, a pointer, a memory address, and the like. One or more third party event scheduling resource user identifiers may be stored to a user profile of a group-based communication system along with other identifiers (e.g., user identifier, group identifiers, group-based communication channel identifiers, etc.). The third party event scheduling resource user identifier may be embodied in a format native to the third party event scheduling resource to which it is associated or may be structured in a format designated by the group-based communication system. Correlating one or more third party event scheduling resource user identifiers to a user account or user identifier of the group-based communication system allows the group-based communication system to link accounts from disparate third party event scheduling resources with a selected group-based communication system user account.

The term "electronic group-based communication calendar digest" in this context refers to a collection of group-based communication data objects (e.g., files, group-based communication channels, threads, communication messages, and/or user identifiers and associated identifiers for each) determined to be relevant and related an event occurrence. The electronic group-based communication calendar digest may also include other data objects (e.g., emails from third party event scheduling resources and other event occurrence identifiers (that is, other than the event occurrence identifier for the event occurrence associated with the electronic group-based communication calendar digest)). The electronic group-based communication calendar digest may be specific to a single event occurrence or a plurality of event occurrences. The electronic group-based communication calendar digest may be transmitted, in real-time, from the server to the client device, and rendered, in real-time, by the group-based communication interface. The electronic group-based communication calendar digest comprises data objects retrieved from a group-based communication system and/or third-party scheduling resource responsive to a query within the group-based communication system and/or third-party scheduling resource. For example, a package or bundle of group-based communication channels, specific users, and a specific set of files related to a new marketing initiative may be packaged or bundled together in an electronic group-based communication calendar digest for an employee to review prior to a meeting regarding the new marketing initiative.

As used herein, "data objects" refers to any form of data stored on the group-based communication system or third party event scheduling resource created by a user (not necessarily the user of the group-based communication system or third party event scheduling resource). Files, communication messages, emails, event occurrence data structures, user identifiers, group-based communication channels, threads, etc. would all be considered data objects and may be displayed with appropriate identifiers. That is, in some instances the data object is displayed by an identifier which may be configured as a user engageable link providing access to the data object.

As used herein, the terms "group-based communication object," "group-based communication data object," and "group-based communication data works object" refer to a collection of data and instructions that represent an item or resource of the group-based communication system. Each group-based communication object has an object identifier that uniquely identifies a particular group-based communication object in the group-based communication system and an object type, which describes the category of objects to which the group-based communication object belongs. In some embodiments, users may perform actions via a group-based communication interface that create or modify group-based communication objects. Example group-based communication objects include group-based communication channels, user profile identifiers, indications of user profiles (such as pointers with reference to user profiles), files created and maintained in the group-based communication system, files linked or uploaded to the group-based communication system, user accounts, emojis posted in a group-based communication channel, emojis available in a group-based communication channel, metadata associated with group-based communication messages such as an author identifiers, a post timestamp, a channel identifier, user identifiers of users with access rights to the group-based communication message, and the like.

The term "group-based communication conversation segment" refers to a set of communication messages grouped by a server in a group-based communication system where all communication messages within the conversation segment are determined to have at least one identical conversation primitive identifier. In some embodiments, communication messages in one conversation segment are directed to the same topic. In some embodiments, the set of communication messages in one conversation segment has message send order proximity, message send time proximity, and sending user identifier proximity that exceeds a respective defined threshold. In some embodiments, one conversation segment may be determined to be related to another conversation segment and one conversation segment may include several conversation segments. In some embodiments, a conversation segment may be grouped by a server by using a conversation segmenting learning model, which may be derived using one or more group-based communication message corpuses.

The term "conversation topic" refers to a theme or point of discussion upon which a group-based communication conversation may be focused. The conversation topic is programmatically determined based upon parsing of text strings contained within one or more group-based communication conversation messages associated with a particular group-based communication conversation. In various embodiments, group-based communication conversation segments may each be associated with a conversation topic. In various embodiments, a conversation topic may be analyzed to determine its relation to an event occurrence title for the purposes of detecting conversations associated with an event occurrence.

The term "content topic" refers to a theme or point of discussion upon which content may be focused. The content topic is programmatically determined based upon parsing of text strings contained within one of a file, an event, or any other data or collection of data capable of being transmitted, received, and/or stored. For example, the message may be parsed using a machine learning technique, such as topic modeling (e.g., Latent Dirichlet allocation topic modeling), to determine topics associated with the message. In various embodiments, content creation occurrences may each be associated with a content topic. In various embodiments, a content topic may be parsed (e.g., using PHP commands) to determine its relation to an event occurrence title for the purposes of detecting content associated with an event occurrence.

The term "relevance score" refers to the output of ranking model or algorithm such as a co-ranking model, a statistical model, a machine learning model, a trainable classifier, a supervised learning model, and the like, which indicates the relevance of data objects to an event occurrence based on, for instance, one more event occurrence parameters and attributes of the user (i.e., user profile associated data, client device location, etc.). In one embodiment, the relevance score is used to determine which data objects to include in the electronic group-based communication calendar digest within a group-based communication interface.

The term "diversified subset" in this context refers to diverse data objects rather than data objects highly individualized or channel-based. Thus, a diversified subset of dynamic data objects provides de-individualized content that covers a broad range of data objects from different viewpoints.

The term "digest search bundle" in this context refers to a list or bundle of topics or phrases searched for through data objects in which matches are selected according to relevancy to the event occurrence. The digest search bundle includes text-based topics or phrases, image-based topics or phrases, video-based topics or phrases, and audio-based topics or phrases. For example, an image of the Eiffel tower in Paris may contain a plurality of image descriptors for incorporation into a digest search bundle. Said digest search bundles are used to retrieve data objects.

The term "user interest indicators" refers to one or more items of data that indicate user-associated trends, user behavior, or user reactions, or which may be modeled by a group-based communication system to predict or suggest future user behavior within a group-based communication interface. User interest indicators include all signals of engagement by a user with a group-based communication interface including, without limitation, communication messages and communication message information, user profile associated information, direct messages and direct message information, client device reported location data, mouseover data, click data, channel engagement data, and the like. Such interest indicators could include a popular discussion topics indicator that indicates popular discussion topics in a user's communication messages or direct messages, a user's group-based communication channel access counts, group-based communication channel member discussion frequency indicator that indicates the frequency by which the user interacts with the members of a group-based communication channel, a popular direct message recipients indicator that indicates users that the user most frequently sends a direct message to, a user status value (e.g., a user's role or status within an organization), a user's preferred contacts indicator that indicates preferred users (i.e., wife, kids, parents related to the user or other individuals that the user has indicated as preferred), and a user application reaction indicator that indicates a user's interaction with applications installed in one or more group-based communication channels. User interest indicators may also be determined from aggregated data of other users, perhaps deemed similar to a user of interest (e.g., similar role within a group or enterprise, similar age, gender, etc.), stored to the group-based communication system. Based on these user interest indicators, data objects may be determined that are relevant or of particular interest to a user for an event occurrence.

The term "group-based communication system data corpus" refers to a collection of data that has been received by a group-based communication system through group-based communication interfaces. In some embodiments, a group-based communication system data may comprise one or more of a group-based communication data work objects, group-based communication messages, group-based communication channels, and user profiles associated with the group-based communication system.

The term "group-based communication message timestamp" refers to a digital representation of network time associated with receipt of a group-based communication message by a group-based communication system. The timestamp may be analyzed to determine context regarding the message (e.g., the exact moment at which the message was sent in a group-based communication channel).

The term "email timestamp" refers to a digital representation of network time associated with receipt or transmission of an email by a third party event scheduling resource. The timestamp may be analyzed to determine context regarding the message (e.g., the exact moment at which the message was sent/received in the third party event scheduling resource).

Overview

Discussed herein methods, apparatus, systems, computing devices, computing entities, and/or the like for a group-based data surfacing system for generating and/or transmitting calendar digests of relevant data to various devices/entities associated with an event.

Each client device of a group-based communication system may have an electronic calendar stored on the group-based communication server and/or an electronic calendar stored on a third party event scheduling resource. Each electronic calendar may include a plurality of events or event occurrences scheduled for the user of the client device. The present disclosure provides an improvement upon prior electronic calendars by creating electronic group-based communication calendar digests associated with one or more event occurrences for presenting relevant data to the client device prior to the event occurrences. The group-based communication system may create electronic group-based communication calendar digests including relevant files, user identifiers, group-based communication channels, threads, emails, or other forms of information and cause the electronic group-based communication calendar digests to be displayed to the group-based communication interface when desired to prepare the user of the client device for the event occurrence. That is, a user may prepare for a meeting with the relevant information and participate in the meeting with the relevant content. The electronic group-based communication calendar digests may be programed to be created periodically (e.g., daily, weekly, monthly) to provide relevant data for the event occurrences associated with that period of time (e.g., event occurrences scheduled for the day, week, or month). The electronic group-based communication calendar digests may be programed to be created for an individual event occurrence or a group of event occurrences and may be programed to be created and displayed on demand or at a certain period of time prior to a network time associated with the event occurrence.

The event occurrences may be created and stored on third party event scheduling resources and then accessed by the group-based communication system. For instance, the group-based communication system may access event occurrences from third party event scheduling resources and then extract, parse, and otherwise analyze the event occurrences to form electronic group-based communication calendar digests for display on a group-based communication interface.

Each client device of a group-based communication system is typically associated with a plurality of group-based communication channels and threads and interacts with a plurality of files, other users of the group-based communication system, emails hosted by third party event scheduling resources, and other forms of data objects. Each group-based communication channel receives potentially a flurry of communication messages on a daily basis. These data objects can contain extensive data, resulting in the transfer of large amounts of data, even potentially redundant data. The data transfers require data storage (i.e., memory on the client device), transmission bandwidth, processing power (i.e., retrieval and conversion to appropriate packets for transmission by a server to the client device), and time.

Accordingly, the present disclosure provides a technological improvement that results in minimizing the amount of data transmitted to and from devices and computing entities within a group-based communication system, while also ensuring the most important and/or relevant data is prioritized for consumption in an interface at the desired time. In certain embodiments, one or more electronic group-based communication calendar digests may be generated via a group-based data surfacing system specifically customized to a user of the client device's preferences and made accessible to the client device. The client device thereby receives curated, relevant information at the desired time, rather than locally storing numerous files, communication messages, emails, etc. and manually scavenging this information. When downloading the electronic group-based communication calendar digest, over, for example, a restricted bandwidth network, download times can be minimal due to the reduced volume of data. Thus, the group-based data surfacing system of the present disclosure provides savings in memory, transmission/network bandwidth, processing power, and time.

Exemplary Architecture & Apparatuses

Methods, apparatuses, and computer program products of the present invention may be embodied by any of a variety of devices. For example, the method, apparatus, and computer program product of an example embodiment may be embodied by a networked device (e.g., an enterprise platform), such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

FIG. 1 shows system 100 including an example network architecture for a system, which may include one or more devices and sub-systems that are configured to implement some embodiments discussed herein. Users may access a group-based communication system 105 and/or a third party event scheduling resource 103 via a communications network 108 using client device 102 or any one or more of a plurality of client devices 101A-101N. The group-based communication system 105 may comprise a group-based communication server 106 in communication with at least one group-based communication repository 107. For example, system 100 may include group-based communication system 105 which includes group-based communication server 106, which can include, for example, the circuitry disclosed in FIGS. 2, 3A, and 3B, a server, or database, among other things (not shown) and group-based communication repository 107, which can include, for example, the circuitry disclosed in FIGS. 2, 3A, and 3B, a server, or database, among other things (not shown). The group-based communication server 106 may include any suitable network server and/or other type of processing device. In some embodiments, the group-based communication server 106 may determine and transmit commands and instructions for rendering an electronic group-based communication calendar digest to client devices 101A-101N using data from the data surfacing database 210 and the generated queries to the data surfacing database 210 to locate data objects associated with the one or more topics.

The group-based communication repository 107 may be embodied as a data storage device such as a Network Attached Storage (NAS) device or devices, or as a separate database server or servers. The group-based communication repository 107 includes information accessed and stored by the group-based communication server 106 to facilitate the operations of the group-based communication system 105. For example, the group-based communication repository 107 may include, without limitation, a plurality of communication messages organized among a plurality of group-based communication channels, and/or the like.

Information about one or more event occurrences may be drawn from the group-based communication repository 107, and then, in light of the information, one or more queries are generated and used to locate data objects associated with the one or more topics in the data surfacing database 210. The queries may be altered based on information received from a user input, a user request, a user identifier or the like.

Group-based communication server 106 can communicate with one or more client devices 101A-101N via communication network 108. In this regard, communication network 108 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, communications network 108 may include a cellular telephone, an 802.11, 802.16, 802.20, and/or WiMax network. Further, the communication network 108 may include a public network, such as the Internet, a private network, such as an intranet, or combinations thereof, and may utilize a variety of networking protocols now available or later developed including, but not limited to TCP/IP based networking protocols. For instance, the networking protocol may be customized to suit the needs of the group-based communication interface. In some embodiments, the protocol is a custom protocol of JSON objects sent via a Websocket channel. In some embodiments, the protocol is JSON over RPC, JSON over REST/HTTP, and the like.

The group-based communication server 106 may be embodied as a computer or computers configured to perform functions as described herein. The group-based communication server 106 may provide for receiving of electronic data from various sources, including but not necessarily limited to the client devices 101A-101N, and the third party event scheduling resource 103. For example, the group-based communication server 106 may be operable to receive and post or transmit group-based messaging communications provided by the client device 102 or any one or more of the plurality of client devices 101A-101N. Further, for example, the group-based communication server 106 may be operable to receive an event occurrence data structure from the third party event scheduling resource 103. The event occurrence data structure may comprise a plurality of event occurrence parameters, which, for example, may be one of an event occurrence identifier, an event occurrence timestamp, an event occurrence event occurrence location identifier, an event occurrence start time identifier, an event occurrence run time identifier, an event completion indicator, an event occurrence invitee identifier, an event occurrence invitation acceptance identifier, an event occurrence invitation decline identifier, or event occurrence attendee identifier, or an event occurrence title.

The client devices 101A-101N may be associated with one or more of an event occurrence creator identifier, event occurrence invitee identifier, an event occurrence acceptance identifier, an event occurrence decline identifier, and an event occurrence attendee identifier. The client devices 101A-101N may be any computing device as defined above. Electronic data received by the group-based communication server 106 from the client devices 101A-101N may be provided in various forms and via various methods. For example, the client devices 101A-101N may include desktop computers, laptop computers, smartphones, netbooks, tablet computers, wearables, and the like.

Client devices 101A-101N and/or group-based communication server 106 may each be implemented as a personal computer and/or other networked device, such as a cellular phone, tablet computer, mobile device, point of sale terminal, inventory management terminal etc., that may be used for any suitable purpose in addition to presenting the interface to facilitate buying items and/or offering items for sale. The depiction in FIG. 1 of client devices 101A-10aN is merely for illustration purposes. Any number of users may be included in the system 100 so long as the users have the proper credentials for accessing the selected group-based communication interface. In one embodiment, the client devices 101A-101N may be configured to display an interface on a display of the client device for viewing, creating, editing, and/or otherwise interacting with an electronic group-based communication calendar digest and event occurrence. According to some embodiments, the group-based communication server 106 may be configured to display the interface on a display of the group-based communication server 106 for viewing, creating, editing, and/or otherwise interacting with an electronic group-based communication calendar digest and event occurrence. In some embodiments, an interface of a client device 101A-101N may be different from an interface of a group-based communication server 106. The client devices 101A-101N may be used in addition to or instead of the group-based communication server 106. System 100 may also include additional client devices and/or servers, among other things. Additionally or alternatively, the client device 101A-101N may interact with the group-based communication system 105 via a web browser. As yet another example, the client device 101A-101N may include various hardware or firmware designed to interface with the system 100.

The client devices 101A-101N may be any computing device as defined above. Electronic data received by the group-based communication server 106 from the client devices 101A-101N may be provided in various forms and via various methods. For example, the client devices 101A-101N may include desktop computers, laptop computers, smartphones, netbooks, tablet computers, wearables, and the like.

In embodiments where a client device 101A-101N is a mobile device, such as a smart phone or tablet, the client device 101A-101N may execute an "app" to interact with the system 100. Such apps are typically designed to execute on mobile devices, such as tablets or smartphones. For example, an app may be provided that executes on mobile device operating systems such as iOS®, Android®, or Windows®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications. Communication with hardware and software modules executing outside of the app is typically provided via application programming interfaces (APIs) provided by the mobile device operating system.

Additionally or alternatively, the client device 101A-101N may interact with the system 100 via a web browser. As yet another example, the client device 101A-101N may include various hardware or firmware designed to interface with the system 100.

The third party event scheduling resource 103 may be embodied as a computer or computers as described herein. The third party event scheduling resource 103 may provide for receiving of electronic data from various sources, including but not necessarily limited to the client devices 101A-101N and group-based communication server 106. For example, a client device 101A-101N may access a third party event scheduling application provided by the third party event scheduling resource 103 to execute functions, flows, or actions associated with an event occurrence. In such a configuration, the third party event scheduling resource 103 may be operable to receive an event occurrence creation request from a client device 101A-101N and send an event occurrence creation confirmation to the client device 102 in response. Further, the third party event scheduling resource 103 may be operable to send any event occurrence invites to any one or more of the plurality of client devices 101A-101N associated with one or more event occurrence invitee identifiers and receive any event occurrence acceptances or event occurrence declines from the one or more of the plurality of client devices 101A-101N associated with one or more event occurrence invitee identifiers. In various embodiments, for example, the third party event scheduling resource 103 may be configured to store historical event occurrence attendance data associated with the event occurrence invitee identifiers. In such a configuration, the third party event scheduling resource 103 may be operable to send the historical event occurrence attendance data associated with each of the event occurrence invitee identifiers to a group-based communication server 106. The third party event scheduling resource 103 may be operable to send an event occurrence data structure to a group-based communication server 106.

In some embodiments of an exemplary group-based communication system, a message or communication message may be sent from a client device 101A-101N to a group-based communication server 106. In various implementations, the message may be transmitted to the group-based communication system 105 over communications network 108 directly by a client device 101A-101N, the message may be transmitted to the group-based communication system 105 via an intermediary such as a message server, and/or the like. For example, the client device 101A-101N may be a desktop, a laptop, a tablet, a smartphone, and/or the like that is executing a client application (e.g., a group-based communication app). In one implementation, the message may include data such as a message identifier, sending user identifier, a group identifier, a group-based communication channel identifier, message contents (e.g., text, emojis, images, links), attachments (e.g., files), message hierarchy data (e.g., the message may be a reply to another message), third party metadata, and/or the like. In one embodiment, the client device 101A-101N may provide a message, substantially in the form of a (Secure) Hypertext Transfer Protocol ("HTTP(S)") POST message including eXtensible Markup Language ("XML") formatted data, as provided below:

```
POST/authrequest.php HTTP/1.1
Host: www.server.com
Content-Type: Application/XML
Content-Length: 667
<?XML version="1.0" encoding="UTF-8"?>
<auth_request>
    <timestamp>2020-12-31 23:59:59</timestamp>
    <user_accounts_details>
    <user_account_credentials>
    <user_name>ID_user_1</user_name>
    <password>abc123</password>
    //OPTIONAL <cookie>cookieID</cookie>
    //OPTIONAL
        <digital_cert_link>www.mydigitalcertiflcate.com/
        JohnDoeDaDoeDoe@gmail.com/mycertifcate.dc</
        digital_cert_link>
    //OPTIONAL <digital_certiflcate>_DATA_</digital_cer-
        tiflcate>
    </user_account_credentials>
    </user_accounts_details>
    <client_details>//iOS Client with App and Webkit
    //it should be noted that although several client details
    //sections are provided to show example variants of client
    //sources, further messages will include only on to save
    //space
    <clientIP>10.0.0.123</clientIP>
    <user_agent_string>Mozilla/5.0 (iPhone; CPU iPhone
    OS 7_1_1 like Mac OS X) AppleWebKit/537.51.2
    (KHTML, like Gecko) Version/7.0 Mobile/11D201 Safari/
    9537.53</user_agent_string>
    <client_product_type>iPhone6,1</client_product_type>
    <client_serial_number>DNXXX1X1XXXX</client_se-
rial_number>
    <client_UDID>3XXXXXXXXXXXXXXXXXXXXXX
XXD</client_UDID>
    <client_OS>iOS</client_OS>
    <client_OS_version>7.1.1</client_OS_version>
    <client_app_type>app_with_webkit</client_app_type>
    <app_installed_flag>true</app_installed_flag>
    <app_name>MSM.app</app_name>
    <app_version>1.0</app_version>
    <app_webkit_name>Mobile    Safari</client_webkit_
name>
    <client_version>537.51.2</client_version>
    </client_details>
    <client_details>//iOS Client with Webbrowser
    <clientIP>10.0.0.123</clientIP>
    <user_agent_string>Mozilla/5.0 (iPhone; CPU iPhone
    OS 7_1_1 like Mac OS X) AppleWebKit/537.51.2
    (KHTML, like Gecko) Version/7.0 Mobile/11D201 Safari/
    9537.53</user_agent_string>
    <client_product_type>iPhone6,1</client_product_type>
    <client_serial_number>DNXXX1X1XXXX</client_se-
rial_number>
    <client_UDID>3XXXXXXXXXXXXXXXXXXXXXX
XXD</client_UDID>
    <client_OS>iOS</client_OS>
    <client_OS_version>7.1.1</client_OS_version>
    <client_app_type>web browser</client_app_type>
    <client_name>Mobile Safari</client_name>
    <client_version>9537.53</client_version>
    </client_details>
    <client_details>//Android Client with Webbrowser
    <clientIP>10.0.0.123</clientIP>
    <user_agent_string>Mozilla/5.0 (Linux; U; Android
    4.0.4; en-us; Nexus S Build/IMM76D) AppleWebKit/534.30
    (KHTML, like Gecko) Version/4.0 Mobile Safari/534.30</
user_agent_string>
    <client_product_type>Nexus S</client_product_type>
    <client_serial_number>YXXXXXXXX</client_serial_
number>
    <client_UDID>FXXXXXXXXX-XXXX-XXXX-
XXXX-XXXXXXXXXXXX</client_UDID>
    <client_OS>Android</client_OS>
    <client_OS_version>4.0.4</client_OS_version>
    <client_app_type>web browser</client_app_type>
    <client_name>Mobile Safari</client_name>
    <client_version>534.30</client_version>
    </client_details>
    <client_details>//Mac Desktop with Webbrowser
    <clientIP>10.0.0.123</clientIP>
    <user_agent_string>Mozilla/5.0 (Macintosh; Intel Mac
    OS X 10_9_3) AppleWebKit/537.75.14 (KHTML, like
    Gecko) Version/7.0.3 Safari/537.75.14</user_agent_string>
    <client_product_type>MacPro5,1</client_product_type>
    <client_serial_number>XXXXXXXXX</client_serial_
number>
    <client_UDID>FXXXXXXXXX-XXXX-XXXX-
XXXX-XXXXXXXXXXXX</client_UDID>
    <client_OS>Mac OS X</client_OS>
    <client_OS_version>10.9.3</client_OS_version>
    <client_app_type>web browser</client_app_type>
    <client_name>Mobile Safari</client_name>
    <client_version>537.75.14</client_version>
    </client_details>
    <message>
    <message_identifier>ID_message_10</message_identi-
fier>
    <team_identifier>ID team 1</team_identifier>
    <channel_identifier>ID_channel1</channel_dentifier>
    <contents>That is an interesting invention. I have
attached a copy our patent policy.</contents>
    <attachments>patent_policy.pdf</attachments>
    </message>
</auth_request>
```

The group-based communication system 105 comprises at least one group-based communication server 106 that may create a storage message based upon the received message to facilitate message indexing and storage in a communication message database. In one implementation, the storage message may include data such as a message identifier, a group identifier, a group-based communication channel identifier, a sending user identifier, topics, responses, message contents, attachments, message hierarchy data, third party metadata, conversation primitive data, and/or the like. For example, the group-based communication server 106 may provide the following example storage message, substantially in the form of a HTTP(S) POST message including XML-formatted data, as provided below:

POST/storage_message.php HTTP/1.1
Host: www.server.com
Content-Type: Application/XML
Content-Length: 667
<?XML version="1.0" encoding="UTF-8"?>
<storage_message>
   <message_identifier>ID_message_10</message_identifier>
   <team_identifier>ID team 1</team_identifier>
   <channel_identifier>ID_channel1</channel_dentifier>
   <sending_user_identifier>ID_user_1</sending_user_identifier>
   <topics>
   <topic>inventions</topic>
   <topic>patents</topic>
   <topic>policies</topic>
   </topics>
   <responses>
   <response>liked by ID_user_2</response>
   <response>starred by ID_user_3</response>
   </responses>
   <contents>That is an interesting invention. I have attached a copy our patent policy.</contents>
   <attachments>patent_policy.pdf</attachments>
   <conversation_primitive>
   conversation includes messages: ID_message_8, ID_message_9, ID_message_10, ID_message_11, ID_message_12
   </conversation_primitive>
</storage_message>

In embodiments, a group identifier as defined above may be associated with the message.

In embodiments, a group-based communication channel identifier as defined above may be associated with the message.

In embodiments, a sending user identifier as defined above may be associated with the message. In one implementation, the message may be parsed (e.g., using PHP—i.e. the script language derived from Personal Home Page Tools—commands) to determine a sending user identifier of the user who sent the message.

In embodiments, topics may be associated with the message. In one implementation, the message contents may be parsed (e.g., using PHP commands) to determine topics discussed in the message. For example, hashtags in the message may indicate topics associated with the message. In another example, the message may be analyzed (e.g., by itself, with other messages in a conversation primitive) or parsed using a machine learning technique, such as topic modeling, to determine topics associated with the message.

In embodiments, data indicating responses may be associated with the message. For example, responses to the message by other users may include reactions (e.g., selection of an emoji associated with the message, selection of a "like" button associated with the message), clicking on a hyperlink embedded in the message, replying to the message (e.g., posting a message to the group-based communication channel in response to the message), downloading a file associated with the message, sharing the message from one group-based communication channel to another group-based communication channel, pinning the message, starring the message, and/or the like. Said reaction data may be used to determine or set a user interaction indicator. A user interaction indicator comprises signals of engagement and/or likelihood of engagement by a user with a group-based communication interface including, without limitation, message communications and message communication information, user profile associated information, members of the same or different communication channels, direct messages and direct message information, client device reported location data, mouse-over data, click data, channel engagement data, and the like. In one implementation, data regarding responses to the message by other users may be included with the message, and the message may be parsed (e.g., using PHP commands) to determine the responses. In another implementation, data regarding responses to the message may be retrieved from a database. For example, data regarding responses to the message may be retrieved via a MySQL database command similar to the following:

SELECT messageResponses
FROM MSM_Message
WHERE messageID=ID_message_10.

For example, data regarding responses to the message may be used to determine context for the message (e.g., a social score for the message from the perspective of some user). In another example, data regarding responses to the message may be analyzed to determine context regarding the user (e.g., the user's expertise in a topic may be determined based on the responses to the user's message regarding the topic).

In embodiments, attachments may be included with the message. If there are attachments, files may be associated with the message. In one implementation, the message may be parsed (e.g., using PHP commands) to determine file names of the attachments. For example, file contents may be analyzed to determine context for the message (e.g., a patent policy document may indicate that the message is associated with the topic "patents").

In embodiments, third party metadata may be associated with the message. For example, third party metadata may provide additional context regarding the message or the user that is specific to a company, group, group-based communication channel, and/or the like. In one implementation, the message may be parsed (e.g., using PHP commands) to determine third party metadata. For example, third party metadata may indicate whether the user who sent the message is an authorized representative of the group-based communication channel (e.g., an authorized representative may be authorized by the company to respond to questions in the group-based communication channel).

In embodiments, a conversation primitive may be associated with the message. In one implementation, a conversation primitive is an element used to analyze, index, store, and/or the like messages. For example, the message may be analyzed by itself, and may form its own conversation primitive. In another example, the message may be analyzed along with other messages that make up a conversation, and the messages that make up the conversation may form a conversation primitive. In one implementation, the conversation primitive may be determined as the message, a specified number (e.g., two) of preceding messages and a specified number (e.g., two) of following messages. In another implementation, the conversation primitive may be determined based on analysis of topics discussed in the message and other messages (e.g., in the channel) and/or proximity (e.g., message send order proximity, message send time proximity) of these messages.

In embodiments, various metadata, determined as described above, and/or the contents of the message may be used to index the message (e.g., using the conversation primitive) to facilitate various facets of searching (i.e., search queries that return results from the data surfacing database 210). In one implementation, a storage message may be transmitted from the server to facilitate indexing in the data surfacing database 210. In another implementation, metadata associated with the message may be determined and the message may be indexed in the data surfacing database 210. In one embodiment, the message may be indexed such that a company's or a group's messages are indexed separately (e.g., in a separate index associated with the group and/or company that is not shared with other groups and/or companies). In one implementation, messages may be indexed at a separate distributed database (e.g., to facilitate data isolation for security purposes).

If there are attachments associated with the message, file contents of the associated files may be used to index such files in the data surfacing database 210 to facilitate searching. In one embodiment, the files may be indexed such that a company's or a group's files are indexed at a separate distributed database.

Figure 2:
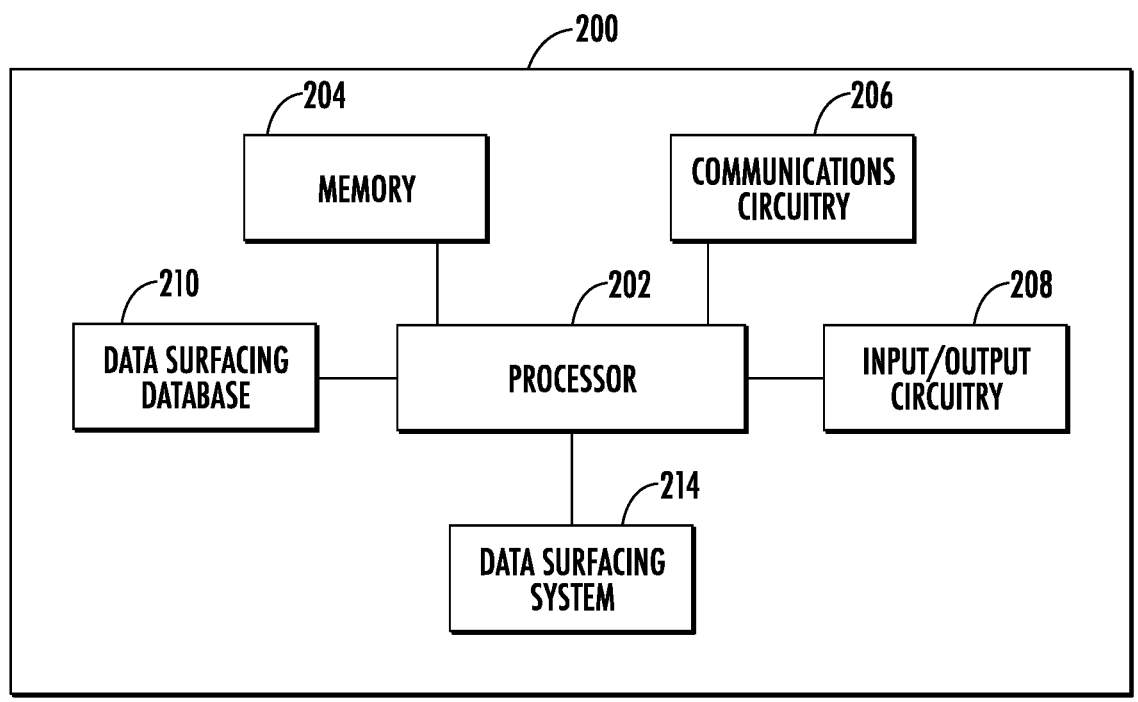
FIG. 2 illustrates a schematic block diagram of circuitry that can be included in a computing device in accordance with some embodiments discussed herein.

FIG. 2 shows a schematic block diagram of circuitry 200, some or all of which may be included in, for example, group-based communication repository 107, group-based communication server 106, and/or client devices 101A-101N. Any of the aforementioned systems or devices may include the circuitry 200 and may be configured to, either independently or jointly with other devices in a communication network 108 perform the functions of the circuitry 200 described herein. As illustrated in FIG. 2, in accordance with some example embodiments, circuitry 200 can include various means, such as processor 202, memory 204, communications circuitry 206, and/or input/output circuitry 208. In some embodiments, data surfacing database 210 and/or a data surfacing system 214 may also or instead be included. The apparatus 200 may be configured to execute the operations described herein. Although the components are described with respect to functional limitations, it should be understood that the particular implementations necessarily include the use of particular hardware. It should also be understood that certain of the components described herein may include similar or common hardware. For example, two sets of circuitry may both leverage use of the same processor, network interface, storage medium, or the like to perform their associated functions, such that duplicate hardware is not required for each set of circuitry.

As referred to herein, "circuitry" includes hardware, software and/or firmware configured to perform one or more particular functions. In this regard, the means of circuitry 200 as described herein may be embodied as, for example, circuitry, hardware elements (e.g., a suitably programmed processor, combinational logic circuit, and/or the like), a computer program product comprising computer-readable program instructions stored on a non-transitory computer-readable medium (e.g., memory 204) that is executable by a suitably configured processing device (e.g., processor 202), or some combination thereof.

Processor 202 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some embodiments processor 202 comprises a plurality of processors. The plurality of processors may be embodied on a single computing device or may be distributed across a plurality of computing devices collectively configured to function as circuitry 200. The plurality of processors may be in operative communication with each other and may be collectively configured to perform one or more functionalities of circuitry 200 as described herein. In an example embodiment, processor 202 is configured to execute instructions stored in memory 204 or otherwise accessible to processor 202. These instructions, when executed by processor 202, may cause circuitry 200 to perform one or more of the functionalities of circuitry 200 as described herein.

Whether configured by hardware, firmware/software methods, or by a combination thereof, processor 202 may comprise an entity capable of performing operations according to embodiments of the present invention while configured accordingly. Thus, for example, when processor 202 is embodied as an ASIC, FPGA or the like, processor 202 may comprise specifically configured hardware for conducting one or more operations described herein. Alternatively, as another example, when processor 202 is embodied as an executor of instructions, such as may be stored in memory 204, the instructions may specifically configure processor 202 to perform one or more algorithms and operations described herein, such as those discussed in connection with FIGS. 1-11.

Communications circuitry 206 may be embodied as any device or means embodied in hardware, a computer program product comprising computer readable program instructions stored on a computer readable medium (e.g., memory 204) and executed by a processing device (e.g., processor 202), or a combination thereof that is configured to receive and/or transmit data from/to another device and/or network, such as, for example, a second circuitry 200 and/or the like. In some embodiments, communications circuitry 206 (like other components discussed herein) can be at least partially embodied as or otherwise controlled by processor 202. In this regard, communications circuitry 206 may be in communication with processor 202, such as via a bus. Communications circuitry 206 may include, for example, an antenna, a transmitter, a receiver, a transceiver, network interface card and/or supporting hardware and/or firmware/software for enabling communications with another computing device.

Communications circuitry 206 may be configured to receive and/or transmit any data that may be stored by memory 204 using any protocol that may be used for communications between computing devices. Communications circuitry 206 may additionally or alternatively be in communication with the memory 204, input/output circuitry 208 and/or any other component of circuitry 200, such as via a bus.

Input/output circuitry 208 may be in communication with processor 202 to receive an indication of a user input and/or to provide an audible, visual, mechanical, or other output to a user (e.g., provider and/or consumer). Some example visual outputs that may be provided to a user by circuitry 200 are discussed in connection with FIGS. 4-6. As such, input/output circuitry 208 may include support, for example, for a keyboard, a mouse, a joystick, a display, a touch screen display, a microphone, a speaker, a RFID reader, barcode reader, biometric scanner, and/or other input/output mechanisms. In embodiments wherein circuitry 200 is embodied as a server or database, aspects of input/output circuitry 208 may be reduced as compared to embodiments where circuitry 200 is implemented as an end-user machine (e.g., consumer device and/or provider device) or other type of device designed for complex user interactions. In some embodiments (like other components discussed herein), input/output circuitry 208 may even be eliminated from circuitry 200. Alternatively, such as in embodiments wherein circuitry 200 is embodied as a server or database, at least some aspects of input/output circuitry 208 may be embodied on an apparatus used by a user that is in communication with circuitry 200. Input/output circuitry 208 may be in communication with the memory 204, communications circuitry 206, and/or any other component(s), such as via a bus. One or more than one input/output circuitry 208 and/or other component can be included in circuitry 200.

Data surfacing database 210 and data surfacing system 214 may also or instead be included and configured to perform the functionality discussed herein related to obtaining electronic group-based communication calendar digests. In some embodiments, some or all of the functionality of generating and/or editing an electronic group-based communication calendar digest may be performed by processor 202. In this regard, the example processes and algorithms discussed herein can be performed by processor 202, data surfacing database 210, and/or data surfacing system 214. For example, non-transitory computer readable media can be configured to store firmware, one or more application programs, and/or other software, which include instructions and other computer-readable program code portions that can be executed to control each processor (e.g., processor 202, data surfacing database 210, and/or data surfacing system 214) of the components of circuitry 200 to implement various operations, including the examples shown above. As such, a series of computer-readable program code portions are embodied in one or more computer program goods and can be used, with a computing device, server, and/or other programmable apparatus, to produce machine-implemented processes.

Figure 3A:
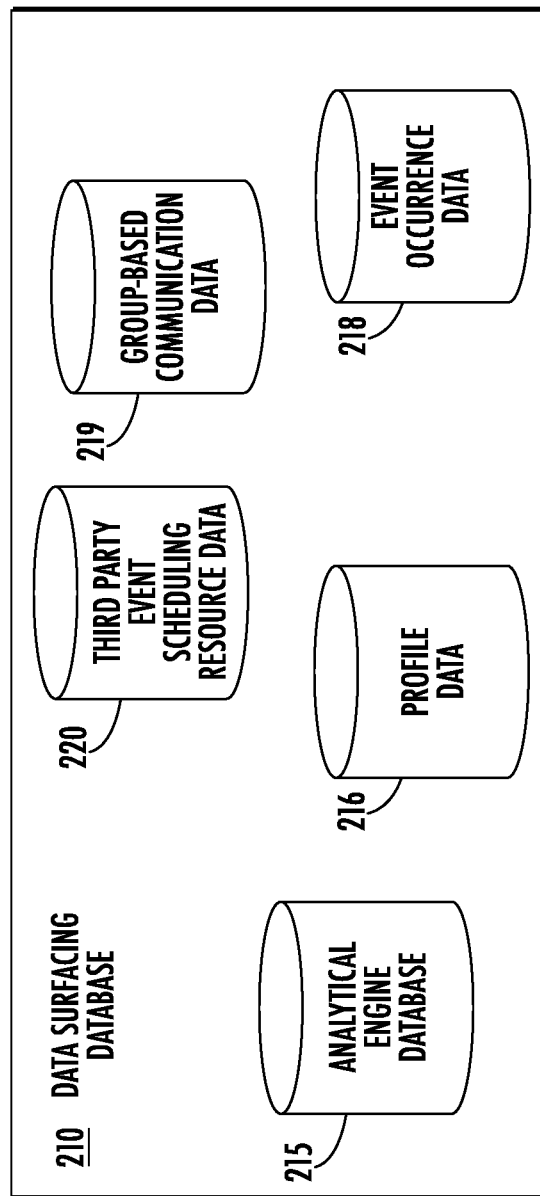
FIG. 3A illustrates an example data surfacing database in accordance with some embodiments discussed herein.

In some embodiments, such as illustrated in FIG. 3A, a data surfacing database 210 may be provided that includes profile data 216, event occurrence data 218, group-based communication data 219, and third party event scheduling resource data 220. Group-based communication data 219 may include group-based communication channels data, thread data, graphical identifiers data, channeling association data, files created or stored in the group-based communication system 105 (e.g., documents, videos, etc.), user identifiers data, and any other similar information. For instance, data relating to group-based communication channels may be stored in the data surfacing database 210 as group-based communication channels data. The data surfacing database 210 may include profile data 216 that includes the biographical data and/or preference data associated with a specific user profile or group profiles. Event occurrence data 218 may include a variety of data related to event occurrences. For instance, the event occurrence data 218 may include event occurrence data structures including the various event occurrence parameters described herein, and any other data associated with the event occurrence. The event occurrence data 218 may be used to determine one or more topics that may be used to generate queries for obtaining data objects. Third party event scheduling resource data 220 may be any information hosted by a third party event scheduling resource that may be accessed by the group-based communication system 105. The group-based communication system 105 may store copies of the third party event scheduling resource data in the data surfacing database 210. The third party event scheduling resource data 220 may be used to create the electronic group-based communication calendar digest. Additionally or alternatively, the data surfacing database 210 may include analytical engine database 215 which may provide any additional information needed by the data surfacing system 214 in analyzing event occurrence data structures and generating and/or editing electronic group-based communication calendar digests.

In some examples, the data surfacing system 214 may be configured to input data surfacing database 210 data. The data surfacing database 210 may include properties of the topics and data objects and the like, relationships that may hold between the topics, data objects, and the like, and representations of any specific knowledge that is required. The data surfacing database 210 may contain information related to a particular domain, industry, and/or group-based communication channel. Example domains may include, but are not limited to, information technology, human resources, marketing, business, medical, industrial, entertainment, news, legal, financial and/or the like. In some examples, the data surfacing system 214 may classify data objects as representative of a category related to the particular domain, in which case the data surfacing system 214 may identify whether the data object identifies a topic of interest. In addition, the data surfacing database 210 is used to weigh data objects which helps in deciding the relevancy to a topic. For example, a file titled "payroll" has a high likelihood of corresponding to the human resources domain and a relatively low likelihood of corresponding to the entertainment domain.

Figure 3B:
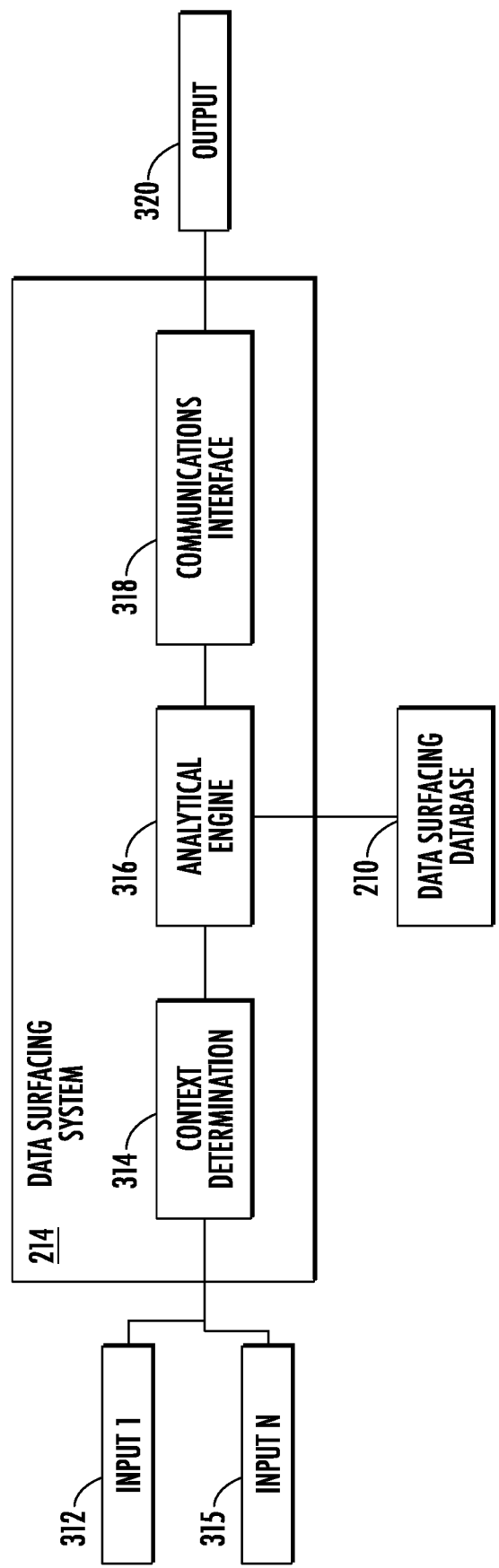
FIG. 3B illustrates an example data surfacing system in accordance with some embodiments discussed herein.

In some embodiments, with reference to FIG. 3B, the data surfacing system 214 may include a context determination module 314, analytical engine 316, and communications interface 318, all of which may be in communication with the data surfacing database 210. The data surfacing system 214 may receive one or more event occurrences, requests, topics, data objects (e.g., channels, user identifiers, etc.), etc. as input 312-315, and may generate electronic group-based communication calendar digests in response. In some embodiments, the input 312-315 may include a direct request from the user to generate an electronic group-based communication calendar digest (e.g., a digest request), while in some embodiments the input 312-315 may include a request from the system to generate an electronic group-based communication calendar digest. In some embodiments, the digest request may indicate that an electronic group-based communication calendar digest is requested on a periodic basis for a group of event occurrences or that an electronic group-based communication calendar digest is requested at a certain period of time prior to the network time associated with the event occurrence or a plurality of event occurrences.

The input 312-315 may comprise a keyword or text-based search input with other modes of search input. For example, input 312-315 can include image input or media input (e.g., video, audio, graphic, image, etc.) to which the data surfacing system 214 can allow for performance of searches based on text-based, image, and/or media search modes of input into a query. Additionally, when the user or data surfacing system 214 initiates a search, other parameters may be used to refine the search results which will be described further below. In yet another example embodiment, the event occurrence may be used as input 312-315. Input 312-315 may include event occurrence data structures or event occurrence parameters as defined above having information related to one or more topics associated with concepts and content, e.g., group-based communication channels, group identifiers, messages, threads, group members, user identifiers, files, emails, other calendar objects, etc.

The data surfacing system 214 can be configured to access said data as well as data corresponding to one or more group-based communication channels, graphical identifiers, user profiles, group profiles, data surfacing database data, files, threads, etc. associated with the user identifier (e.g., an event occurrence invitee identifier or event occurrence creator identifier), and generate electronic group-based communication calendar digests. For instance, an event occurrence may include "Housing Allowance" as a subject. The data surfacing system 214 may have access to the above data to obtain data objects related to housing and/or housing allowance (e.g., files titled "housing" or "housing allowance", group-based communication channels titled "housing" or "housing allowance", communication messages mentioning "housing" or "housing allowance", etc.). The data surfacing system 214 may use any of the algorithms or processes disclosed herein for receiving/capturing data and generating an electronic group-based communication calendar digest in response. In some other embodiments, such as when the circuitry 200 is embodied in a group-based communication repository 107, group-based communication server 106 and/or client devices 101A-101N, the data surfacing system 214 may be located in another circuitry 200 or another device, such as another group-based communication server 106, group-based communication repository 107, and/or client devices 101A-101N.

With reference to FIG. 3B, whether used locally or over a network, the data surfacing system 214 may be used to generate one or more electronic group-based communication calendar digests of data objects. The data surfacing system 214 may receive a plurality of input 312-315 from the circuitry 200 and process the inputs 312-315 within the data surfacing system 214 to produce an output 320, which may include one or more electronic group-based communication calendar digests. In some embodiments, the data surfacing system 214 may execute context determination using the context determination module 314, process the data in an analytical engine 316, and communications interface 318 to generate an electronic group-based communication calendar digest and output the results via a group-based communication interface. Each of these steps may pull data from a plurality of sources including the data surfacing database 210, which may be located in the group-based communication server 106, group-based communication repository 107, and/or client devices 101A-101N.

When input 312-315 is received by the data surfacing system 214, context determination using the context determination module 314 may first be made. A context determination includes such information as a user or group preference data, when and what user initiated receipt of the input (e.g., when and who selected the actuator that initiated the request), what type of input was provided (e.g., was a digest request initiated, was an event occurrence data structure received) and under what circumstances was receipt of the input initiated (e.g., was the event occurrence data structure received from a third party event scheduling resource or client devices 101A-101N, etc.). This information may give context to the data surfacing system 214 analysis to determine the output. For example, the context determination module 314 may inform the data surfacing system 214 as to when and what electronic group-based communication calendar digest to output.

The analytical engine 316 may then extract one or more event occurrence parameters from the applicable event occurrence data structure(s). The extracted one or more event occurrence parameters are used to determine one or more topics (e.g., conversation topics or content topics) that are then used to form queries for use in creating the digest search bundles in the analytical engine 316. In some embodiments, the extracted one or more event occurrence parameters are analyzed to determine one or more topics (e.g., conversation topics or content topics) associated with the event occurrence. The data surfacing system 214 may draw information from the data surfacing database 210 to determine one or more topics. The data surfacing system 214 may use multiple techniques to extract one or more event occurrence parameters and analyze the parameters and can include, but are not limited to: extracting keywords, using machine learning, to match the text query, extracting keywords derived from the event occurrence parameters, parsing the attached media for embedded metadata, extracting annotations or commentary associated with the event occurrence parameters, and combinations thereof. The input 312-315 includes an event occurrence data structure including one or more event occurrence parameters (e.g., what user profile is associated with the user identifier associated with the event occurrence). Additionally or alternatively, the input 312-315 may include a query for at least one of a group-based communication channel, topic, or user identifier. These inputs may give context to the data surfacing system 214 to determine the output. For example, the context determination module 314 may inform the data surfacing system 214 as to what communication message information, group-based communication channels, user identifiers, files, threads, other event occurrences, email, etc. to include or identify with the output electronic group-based communication calendar digests.

The data surfacing system 214 may then analyze the topics to generate digest search bundles via the analytical engine 316. The analytical engine 316 draws information about the topics, the one or more parameters stored in the data surfacing database 210, and/or other information stored in the data surfacing database 210 and then, generates digest search bundles of the topics to locate data objects associated with the one or more topics and then retrieves data objects for the electronic group-based communication calendar digest. The data surfacing system 214 may then output 320 the data objects in a digest form via the communications interface 318.

The data surfacing system 214 may query third party event scheduling resources for data objects. The data surfacing system 214 may query third party event scheduling resources with the digest search bundles based on the topics to locate data objects and copy located data objects for use by the analytical engine 316 in creating the electronic group-based communication calendar digest. The digest search query bundles may include different data than would be in a digest search query bundle directed to the data surfacing database 210, and may be particular to the third party event scheduling resource. In some embodiments, emails may have been previously forwarded to the group-based communication system 105 and stored on the group-based communication system 105. In such cases, the data surfacing system 214 may query the data surfacing database 210 and obtain such emails. In some embodiments, the data surfacing system 214 may analyze emails as the emails are received by the group-based communication system 105 as disclosed herein and categorize or store the emails based on the analysis of the emails. When the emails have not been previously forwarded to the group-based communication system 105, the group-based communication system may cause a search request to be transmitted to the third party event scheduling resource, which would then need to accept the request for the group-based communication system 105 to obtain the data objects from the third party event scheduling resource.

In some embodiments, the analytical engine 316 may determine that a digest search bundle has already been presented. In such cases, the data surfacing system 214 may output 320 another generated copy of the electronic group-based communication calendar digest or may output 320 a reference/pointer to the already generated digest. The analytical engine 316 may determine that a digest has already been presented by identifying the topics associated with the event occurrence. The analytical engine 316 is further configured to ensure that the electronic group-based communication calendar digest is fresh and up to date. For example, the selected data objects may pertain to a software project, particularly an agile methodology software project. Data objects may pertain to project release timelines, development phases, events, and so on. These data objects are collected and culled to pertain to particular topics and distinct temporal characteristics. For example, in the aforementioned agile project, a set of data objects may represent distinct temporal content in chronological order, ranging from an oldest to a most recent content pertaining to the agile project. The data objects are preferably selected to accurately convey the temporal level to be associated with the topic. For instance, a file may be listed as the oldest and directed to a "planning phase" of the "upcoming development cycle" at a particular date/time. A message may then be listed as the next oldest and may comment on the expected deliverables, team work capacity, and current project impediments. An email may be listed as the next oldest and may describe the outcome of the first development cycle, along with tasks completed, lessons learned, etc. A message may then be listed as the next oldest and may provide a re-cap of the development cycle, along with feedback from the development team, business owners, etc. These are but examples of course, and it will be understood that the temporal classifications may be more coarse or granular depending on the particular event occurrence and user preferences.

In one embodiment, the analytical engine 316 may determine semantic importance of one or more keywords or text phrases found in each event occurrence data structure. The analytical engine 316 may select keywords or phrases that appear most often in the event occurrence data structures as the most semantically important keywords or phrases. Other text analytic techniques may be applied to rank keywords and/or text phrases and determine most important text phrases. In another example embodiment, the important keywords or phrases may be identified based on keywords or phrases already associated with the event occurrence according to data surfacing database 210. In yet another example embodiment, important keywords or phrases may be identified based on other event occurrences considered peripheral to the event occurrence, but not directly associated with the event occurrence. Once the important keywords and/or text phrases are identified, data objects matching the important keywords and/or text phrases may be retrieved from the data surfacing database 210. As such, the data objects may be associated with a variety of users and channels and not necessarily a channel where the user is a member.

Examples of content ranking for use with embodiments of the present disclosure are disclosed in U.S. patent application Ser. No. 15/853,376 titled "SYSTEM, APPARATUS, AND COMPUTER PROGRAM PRODUCT FOR GENERATING A GROUP-BASED COMMUNICATION INTERFACE HAVING IMPROVED PANES POSITIONED IN A DEFINED DISPLAY WINDOW," filed Dec. 22, 2017, the contents of which are incorporated herein by reference in their entirety.

Once the set of data objects are identified, the analytical engine 316 can further filter the set to identify or highlight data objects that may be considered to be particularly interesting or relevant to the user. In one embodiment, relevancy may be based on the user's own actions. As described above, users may respond to group-based communication messages made by other users via reactions (e.g., selection of an emoji associated with the message, selection of a "like" button associated with the message), click on a hyperlink embedded a the message, reply to a message (e.g., posting a message to the group-based communication channel in response to the message), download a file, share a message from one group-based communication channel to another group-based communication channel, pin a message, star a message, follow a channel, unfollow a channel, create a thread, create a channel, follow a user identifier, unfollow a user identifier, attend an event occurrence, not attend an event occurrence, and/or the like. In one implementation, relevant data objects are based on if other users who are similar to the user are interested in the data objects. In yet another example implementation, relevant data objects may be implicitly identified by analyzing user behaviors implying that the user has an interest in certain data objects associated with the behaviors. For example, the user may follow a topic, a group-based communication channel, or a specific user to which the analytical engine 316 may determine the topic, the channel, or specific user followed as particularly relevant to the user.

In some embodiments, the analytical engine 316 may be configured for selecting diverse content for inclusion in the digest. For example, the analytical engine 316 may calculate a diversity score indicative of a diversity of the data objects and select and order the data objects associated with the one or more concepts based on the diversity score to create a diversified set of data objects for presenting in the electronic group-based communication calendar digest. In said embodiment, a diversity parameter may be that a minimum threshold number of distinct group-based communication channels or threads, files, user identifiers, communication messages or emails, other event occurrences, or combinations thereof are to be presented or identified in the group-based communication calendar digest. The diversity parameter may be used to select data objects for the group-based communication calendar digest.

The analytical engine 316 may further provide additional filtering parameters associated with the selected data objects. Additional filtering may be applied after or concurrently with the data objects retrieval. In some embodiments, data objects are filtered in response to receipt of a user request for the most recent data objects or data objects within a certain period of time. The analytical engine 316 may provide an interval of time for selection of the data objects, such as, for example, 7 days, 2 weeks, 1 month, 1 year, 2 years, etc. For example, the analytical engine 316 may filter the data objects for that which was created/stored within a 6 week time frame.

The analytical engine 316 may be configured to provide additional filtering parameters preferably comprising developing a relevance score assigned to each data object, and then selecting the data objects according to relevance scores. In an example embodiment, the relevance score indicates the likely relevance of a data object to the user of the client device based on the respective event occurrence data structure and user interest indicators retrieved from the user profile data associated with the client device. Selection of data objects may be based on the score of an item satisfying a certain threshold, having the highest scores up to a certain number, matching a certain criteria, by removing results that match another criteria, or by any suitable selection technique.

The relevance score may also consider the timestamp associated with the data object in comparison to the network time associated with the event occurrence start time identifier of the respective event occurrence. Newer content may be scored as more relevant than older content, or content within a defined time period may be scored as more relevant than content associated with timestamps outside of that period of time. The user may adjust the period of time when initiating a digest request. For instance, if the data object was created months prior to the network time associated with the event occurrence start time identifier of the respective event occurrence, such data object may have a lower score than data objects created within a week from the network time. The analytical engine 316 may also consider the proportion of the data object related to the topic when determining the relevance score. For instance, data objects with a high number of topic "hits" within the data object may be scored higher than data objects with a single mention of the topic. The analytical engine 316 may also consider the users associated with the data object when determining the relevance score. For instance, data objects shared among attendees of the relevant event occurrence may be scored higher than data objects shared among a single attendee and a non-attendee.

The analytical engine 316 may be configured to access data surfacing database 210 to determine one or more user interest indicators from profile data. Such user interest indicators may be a user status indicator, a user job indicator, a user interaction indicator, and the like. The analytical engine 316 may score data objects higher when their topics (e.g., key terms, metadata, file contents, etc.) correspond to a user's status or job within an organization. For example, a user may be an engineer for a project. In such embodiment, the analytical engine 316 may score data objects associated with a supervisor of the project higher than data objects associated with an engineer not associated with the project but that mentioned the project in a communication message.

In some embodiments, the data surfacing system 214 may make use of one or more machine learning algorithms or statistical models to improve the scoring calculation.

The data objects may be filtered according to its relationship with the digest search bundle, such as a search term. The relevance between the digest search bundle and the data object is preferably directly proportional to the relevance score adjustment, wherein the more similar data object is preferably scored as more relevant than less similar data objects. Alternatively, data objects having high relevance with the digest search bundle can be selected as data objects for aggregation into an electronic group-based communication calendar digest, and thereafter the digest can be transmitted to one or more of client devices 101A-101N.

In yet another example embodiment, data objects are filtered by selecting data objects that satisfies the user settings. Selecting data objects that satisfies the user settings can include selecting data objects generated within the time period defined by the time setting (e.g. within a time threshold measured from the event occurrence, within a user defined time period) and/or selecting data objects that satisfy the digest search bundle (e.g. data object that matches or is related to the digest search bundle). However, any other suitable user setting can be used to select content.

Figure 4:
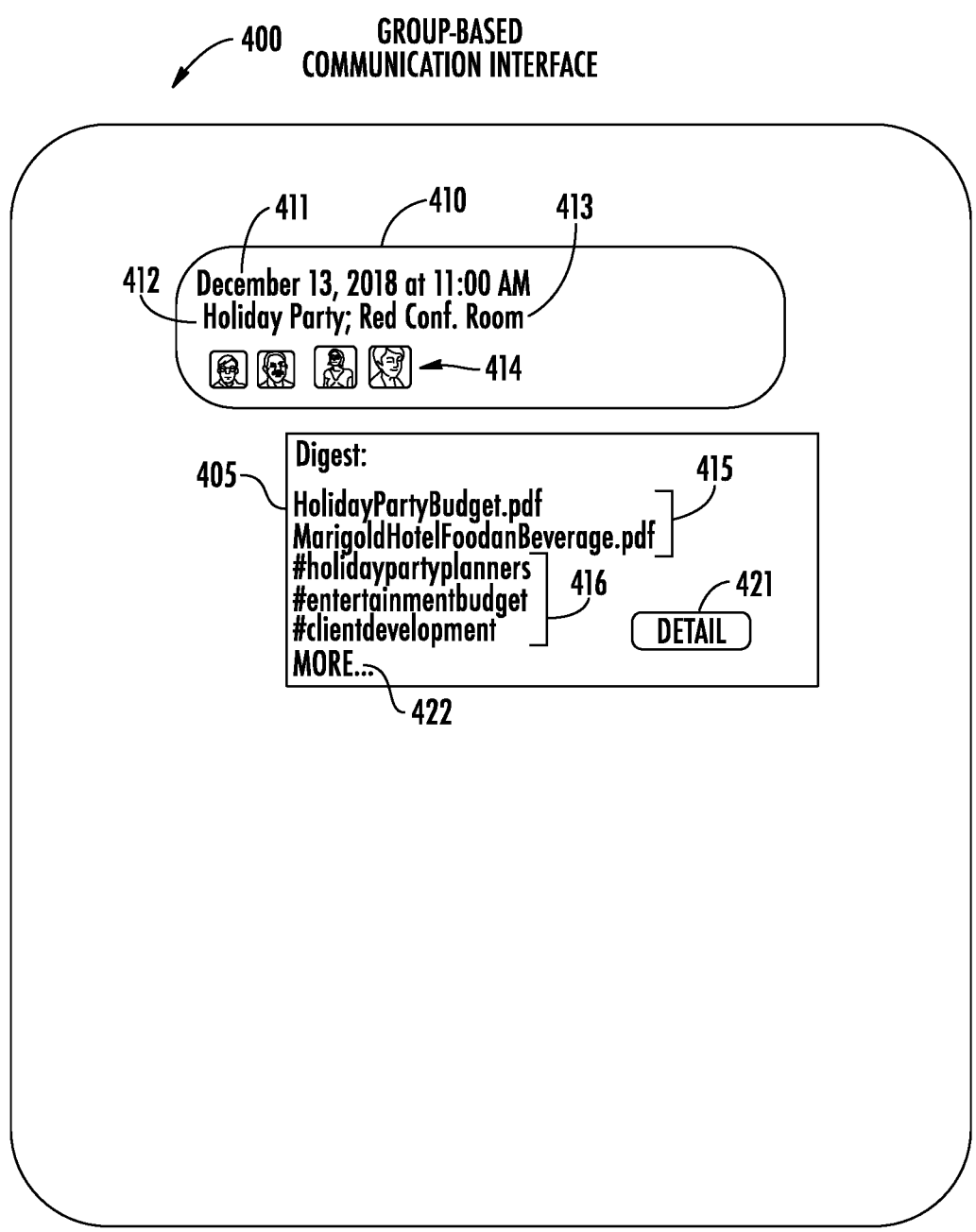
FIG. 4 illustrates an example group-based communication interface displaying an electronic group-based communication calendar digest summary in accordance with some embodiments discussed herein.
Figure 5:
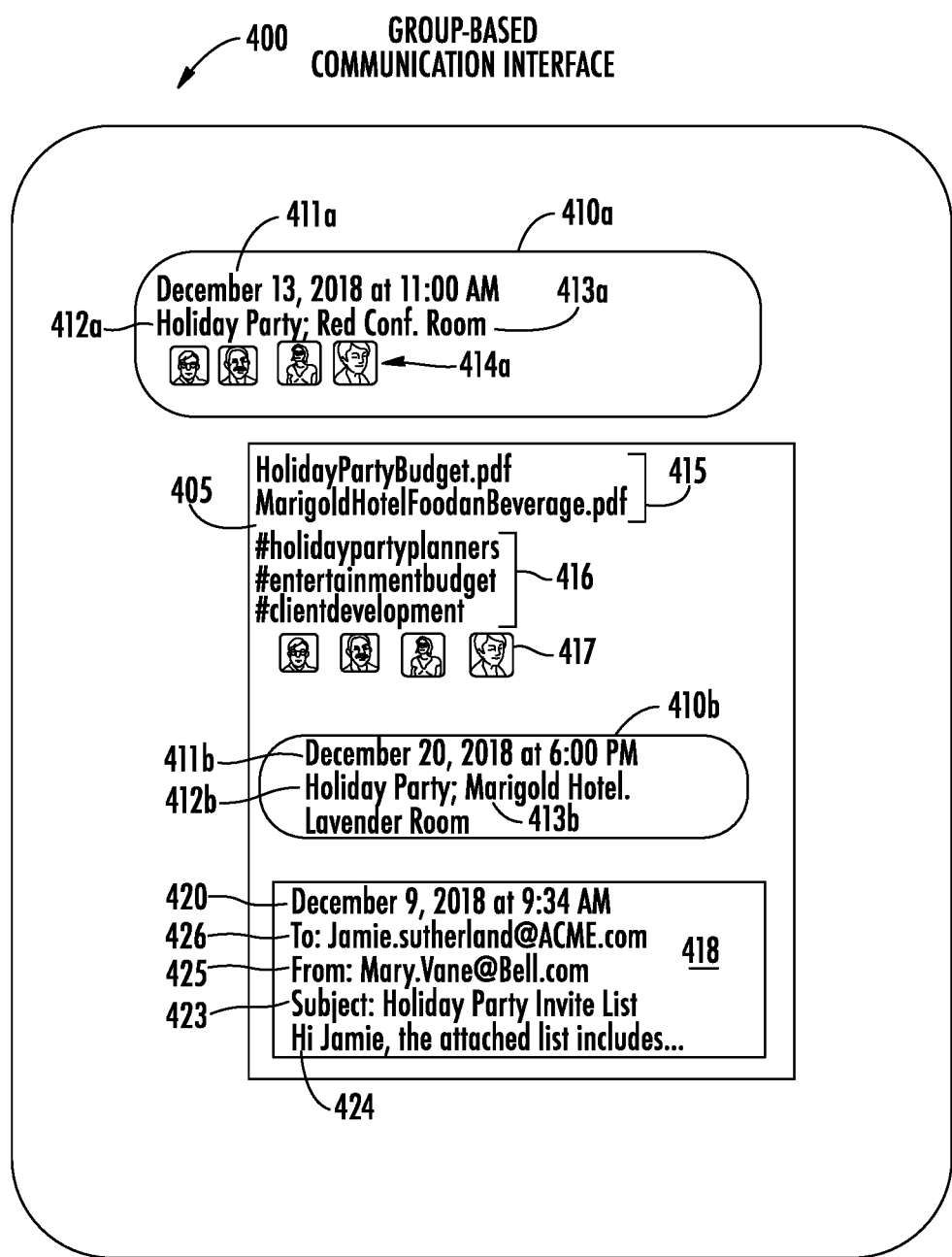
FIG. 5 illustrates an example group-based communication interface displaying an electronic group-based communication calendar digest detail in accordance with some embodiments discussed herein.
Figure 6:
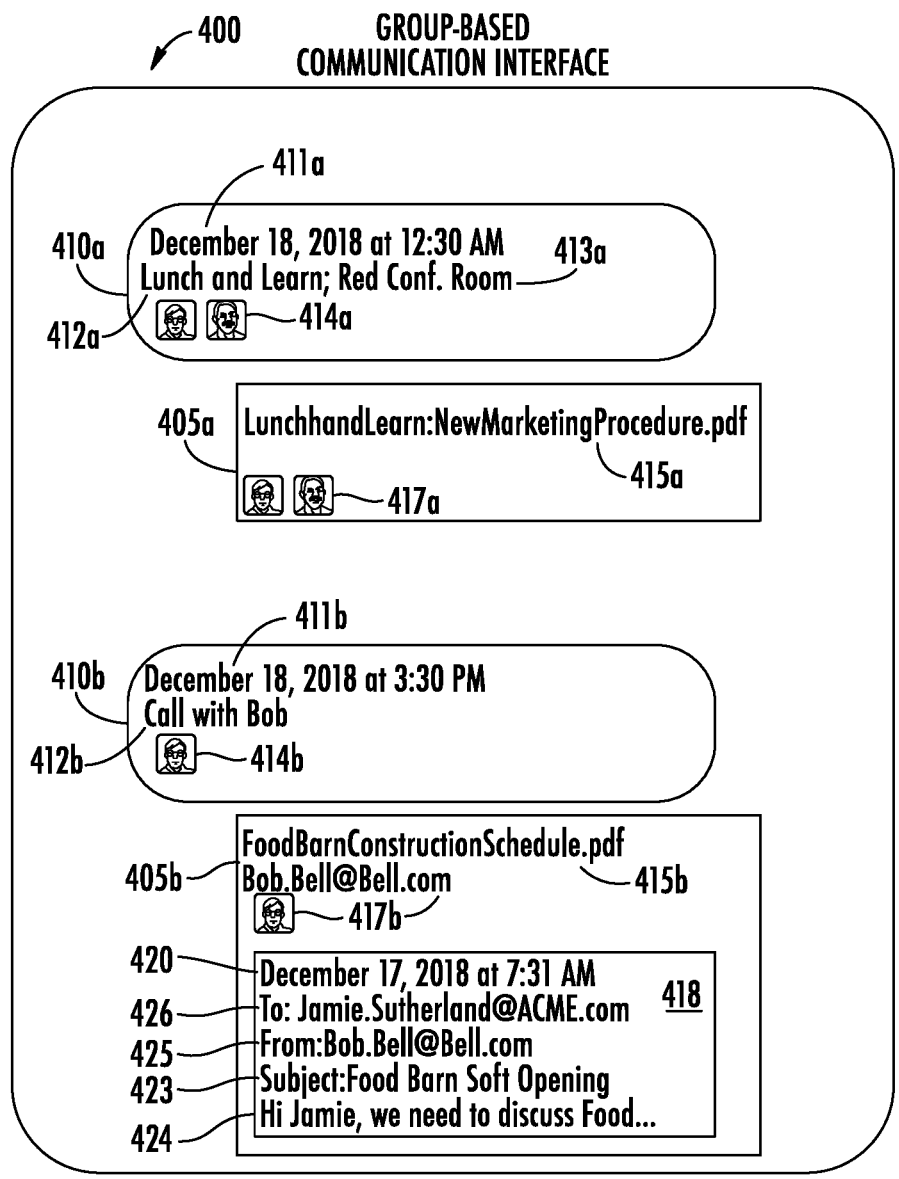
FIG. 6 illustrates an example group-based communication interface displaying a collection of electronic group-based communication calendar digest summaries in accordance with some embodiments discussed herein.

The data objects are preferably organized into an electronic group-based communication calendar digest, as shown in FIGS. 4-6.

As will be appreciated, any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

It is also noted that all or some of the information presented by the example interfaces discussed herein can be based on data that is received, generated and/or maintained by one or more components of a local or networked system and/or circuitry 200. In some embodiments, one or more external systems (such as a remote cloud computing and/or data storage system) may also be leveraged to provide at least some of the functionality discussed herein.

As described above and as will be appreciated based on this disclosure, embodiments of the present invention may be configured as methods, personal computers, servers, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Embodiments of the present invention have been described above with reference to block diagrams and flowchart illustrations of methods, apparatuses, systems and computer program goods. It will be understood that each block of the circuit diagrams and process flowcharts, and combinations of blocks in the circuit diagrams and process flowcharts, respectively, can be implemented by various means including computer program instructions. These computer program instructions may be loaded onto a general purpose computer, special purpose computer, or other programmable data processing apparatus, such as processor 202, data surfacing database 210, and/or data surfacing system 214 discussed above, to produce a machine, such that the computer program product includes the instructions which execute on the computer or other programmable data processing apparatus create a means for implementing the functions specified in the flowchart block or blocks.

These computer program instructions may also be stored in a computer-readable storage device (e.g., memory 204) that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions.

Dynamic UI

Figure 7:
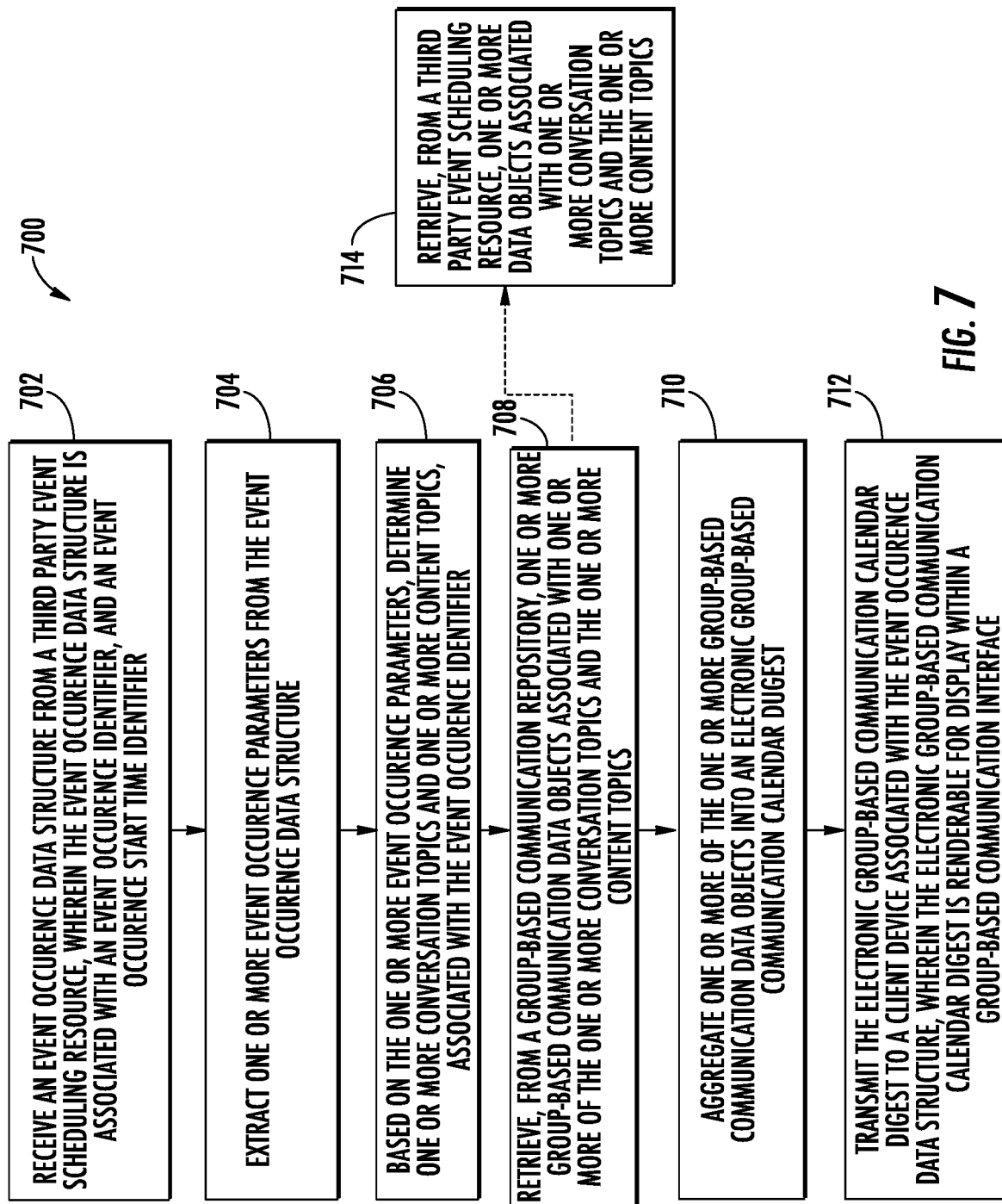
FIG. 7 illustrates a flow diagram of an example group-based communication system in accordance with some embodiments discussed herein.

FIG. 7 illustrates a flow diagram of an example system in accordance with some embodiments discussed herein. In particular, FIG. 7 illustrates method 700 which includes receiving an event occurrence data structure from a third party event scheduling resource, wherein the event occurrence data structure is associated with an event occurrence identifier, an event occurrence creator identifier, and an event occurrence start time identifier 702; extracting one or more event occurrence parameters from the event occurrence data structure 704; based on the one or more event occurrence parameters, determine one or more conversation topics and one or more content topics associated with the event occurrence identifier 706; retrieving, from a group-based communication repository, one or more group-based communication data objects associated with one or more of the one or more conversation topics and the one or more content topics 708; aggregating one or more of the one or more group-based communication data objects into an electronic group-based communication calendar digest 710; and transmitting the electronic group-based communication calendar digest to a client device associated with the event occurrence data structure, wherein the electronic group-based communication calendar digest is renderable for display within a group-based communication interface 712. As shown in FIG. 7, the method 700 may also include retrieving, from a third party event scheduling resource, one or more data objects associated with one or more of the one or more conversation topics and the one or more content topics 714.

The group-based communication interface is configured to allow users of the interface to communicate within group-based communication channels and across group-based communication channels to provide relevant information to other users efficiently and effectively. The group-based communication interface is configured to allow a user to move between group-based communication channels. For instance, a user can search for specific group-based communication channels, highlight specific group-based communication channels to receive notifications or updates regarding communication messages within the group-based communication channel, create specific group-based communication channels, and create group-based communication calendar digests to receive aggregated data objects for event occurrences. A calendar digest can be presented or directly accessed by a user at a desired time without first having to individually access the applicable group-based communication channel, files, threads, emails, etc.

As indicated at block 702 of FIG. 7, the data surfacing system 214 may receive an event occurrence data structure. The event occurrence data structure may be associated with a group-based communication interface and/or a third party event scheduling resource. An event occurrence data structure, as described above, may include a variety of information, such as the event occurrence parameters described herein and may be transmitted to the group-based communications system by a particular user (i.e., a client device associated with the particular user) intended for posting within a group-based communication interface or retrieved by the group-based communications system to post within the group-based communication interface. These event occurrence data structures may be analyzed to determine context regarding the event (e.g., topics associated with the event occurrence parameters).

In block 704, the data surfacing system 214 may extract one or more event occurrence parameters from the event occurrence data structure 704 which functions to determine subject matter that can be of interest to the user prior to or during the event. User interests are preferably derived from the retrieved information associated with the event occurrence data structure, but can also be derived from information received directly from the user. User interests are preferably derived from the event occurrence parameters, files (e.g., documents, images, videos, etc.), text, or any other suitable form of information found in the event occurrence data structure and are referred to as topics. In some embodiments, the data surfacing system 214 may be configured to segment the event occurrence parameters, files (e.g., documents, images, videos, etc.), text, or any other suitable form of information found in the event occurrence data structure into keywords/topics. As part of the segmenting process, the data surfacing system 214 may normalize the data, performing operations such as stemming or removing words that do not provide information (e.g., "the," "a," or the like).

In block 706, the data surfacing system 214 may generate queries to a data surfacing database 210 to locate data objects associated with the one or more topics 708. The queries relate to a particular topic associated with the event occurrence data structure. The data surfacing system 214 may store the generated queries in the data surfacing database 210. In some embodiments, the queries may relate to particular topics associated with the event occurrence data structure and may query a third party event scheduling resource to obtain data objects as shown in block 714.

As shown in block 708, the data surfacing system 214 may retrieve the data objects to be presented based on one or more conversation topics or content topics 708 with which the data objects is filtered.

At block 708, the data surfacing system 214 may determine for each of the data objects a relevance score. In the depicted embodiment, the relevance score indicates the likely relevance of the data object to the user of the client device based on attributes of the data object and user interest indicators retrieved from the user profile data associated with the client device as discussed herein. In another embodiment, the relevance score may be further based on attributes of group-based communication channels (i.e., channel topics, channel metadata, channel membership groups, etc.) that correspond to the event occurrence data structure. The data objects may be filtered by determining whether the relevance score associated with each data object meets a predetermined or relative threshold and thereby meets a relevance parameter. For instance, in some embodiments, the data surfacing system 214 may only consider data objects above a particular threshold score for inclusion in the electronic group-based communication calendar digest.

Considering the above information, the data surfacing system 214 may automatically rank lower and/or remove similar message communications that have similar characteristics (e.g. same author, same channel, same link, same file, etc.). This scoring criteria may be combined with any others discussed above to determine a relevance score.

In example embodiments, the data surfacing system 214 may include a variety of modules to analyze the event occurrence data structures and data objects. In one implementation, such modules may include a work graph generating process (e.g., to generate work graphs (e.g., machine learning structured input data such as a channel's priority for a user)), a machine learning process (e.g., to generate other machine learning structure input data (e.g., team-level term priority), to generate machine learning structures (e.g., team-level neural networks)), and/or the like. For example, the data surfacing system 214 may utilize tools such as Apache Hive®, Presto®, Apache Spark®, Apache Solr® node, and/or the like to facilitate analyzing unstructured or structured data from the message communications.

Considering the above information, relationships between user to user, user to channel, user to topic, and the like may be represented in a work graph which may be surfaced to the data surfacing system 214. The data surfacing system 214 may query the data objects according to a variety of queries related to how close the user and the channel are in the work graph, whether the data object is a link or file, the number of words, lines, and paragraphs in the data object and the like. For example, queries such as "popular with user's channel members," "viewed by the user," "most viewed by the user," and the like may be used.

Accordingly, as shown in block 710, the data surfacing system 214 may aggregate the data objects into an electronic group-based communication calendar digest 710. The selected, filtered, and retrieved data objects may be combined or aggregated to produce an electronic group-based communication calendar digest. The electronic group-based communication calendar digest may be a summary of the data objects from the group-based communication system. These data objects included within the electronic group-based communication calendar digest may be ranked according to their corresponding relevance scores, types of data objects (e.g., files grouped together, emails grouped together, etc.), timestamp, or combinations thereof. In another example embodiment, the highest ranking message may be displayed with a predetermined number of messages that immediately chronologically precede and immediately chronologically follow said highest ranking message within the group-based communication channels in which the highest ranking message is associated with. In yet another example embodiment, said surrounding messages may be included based on their relevancy score.

In one embodiment, each data object may be displayed with the author's name and the timestamp of when the data object was first created, transmitted, or stored. Additionally, each data object may further include the group-based communication channel identifier in which the data object was first created, transmitted, or stored such that when a user selects a data object such as clicking on the data object within the group-based communication interface, the group-based communication interface may cause to render for display the data object within the channel in which the data object originally appeared.

The calendar digest may be transmitted to the user's client device when the calendar digest is to be presented for display on the user's computing device via the group-based communication interface 400 as shown, for example, in FIG. 4.

FIG. 4 illustrates an example group-based communication interface 400 structured in accordance with various embodiments of the invention. In the embodiment illustrated in FIG. 4, the group-based communication interface 400 is displaying an event occurrence data structure 410 which includes an event occurrence timestamp 411, an event occurrence title 412, and one or more event occurrence invitee identifiers or event occurrence creator identifiers 414. In the embodiment illustrated in FIG. 4, the event occurrence data structure 410 also includes an event occurrence location identifier 413, though in some embodiments, an event occurrence location identifier 413 may not be included. In the embodiment illustrated in FIG. 4, the event occurrence invitee identifier or event occurrence creator identifier 414 are avatars, however, any suitable user identifier may be included and may vary within an event occurrence data structure 410, e.g., based on whether the user is a member of the group-based communication system. For example, if an invitee or creator of the event associated with the event occurrence data structure 410 is not a member of the group-based communication system, a third party event scheduling resource user identifier may be displayed in the event occurrence data structure 410 (e.g., "jane.mayard@gmail.com" rather than a group-based communication system user identifier such as that shown in FIG. 4). Any of the components (e.g., event occurrence timestamp 411, event occurrence title 412, event occurrence invitee identifier or event occurrence creator identifier 414, and event occurrence location identifier 413) may be configured as a user engageable link allowing access to additional information. For instance, the event occurrence invitee identifier or event occurrence creator identifier 414 may be user engageable links that allow access to direct messaging with the user associated with the event occurrence invitee identifier or event occurrence creator identifier 414, allows access to profile information of the user associated with the event occurrence invitee identifier or event occurrence creator identifier 414, or other suitable information. In some embodiments, the event occurrence location identifier 413 may be configured as a user engageable link to allow access to a map identifying the location associated with the event occurrence location identifier 413 or similar information regarding the location associated with the event occurrence location identifier 413. The user engageable links may be actuators initiating requests for the relevant action and subsequent display of applicable information.

As shown in FIG. 4, an electronic group-based communication calendar digest 405 has been generated and displayed in the group-based communication interface 400 along with the respective event occurrence data structure 410. In the embodiment illustrated in FIG. 4, the electronic group-based communication calendar digest 405 is a digest summary. That is, only a portion of the full electronic group-based communication calendar digest 405 is displayed in the group-based communication interface 400. The electronic group-based communication calendar digest 405 includes file identifiers 415 and group-based communication channel identifiers 416. Since only a portion of the electronic group-based communication calendar digest 405 is displayed in the group-based communication interface 400, a more information indicator 422, and a digest detail actuator 421, which is a user engageable link allowing access to the digest detail for the electronic group-based communication calendar digest 405, is also displayed. In some embodiments, all of the data objects for the electronic group-based communication calendar digest 405 may be displayed in a digest summary; however, in some embodiments, more data objects may be in the electronic group-based communication calendar digest 405 than can be displayed in a digest summary. Thus, the electronic group-based communication calendar digest 405 may include a more information indicator 422 and a digest detail actuator 421. Each of the file identifiers 415 and group-based communication channel identifiers 416 may be configured as user engageable links allowing access to the respective file or group-based communication channel.

In some embodiments, one or more select communication messages of a group-based communication channel or thread may be displayed as well as the group-based communication channel indicator 416. A portion of the one or more select communication messages of the group-based communication channel or thread may be displayed and may also be displayed with a group-based communication message timestamp as well as user indicators for the initiator of the communication message and any other suitable information associated with the communication message. The communication message may be configured as a user engageable link providing access to the communication message within the group-based communication channel and/or thread.

In the embodiment illustrated in FIG. 4, the electronic group-based communication calendar digest 405 is displayed in the group-based communication interface 400. In some embodiments, the electronic group-based communication calendar digest 405 may be displayed in a group-based communication channel specifically. For instance, the event occurrence data structure 410 may be associated with one or more group-based communication channels. The electronic group-based communication calendar digest 405 may be displayed in the one or more group-based communication channels as a communication message. Similarly, if the event occurrence data structure 410 is associated with one or more threads, the electronic group-based communication calendar digest 405 may be displayed in the one or more threads as a communication message.

Figure 8:
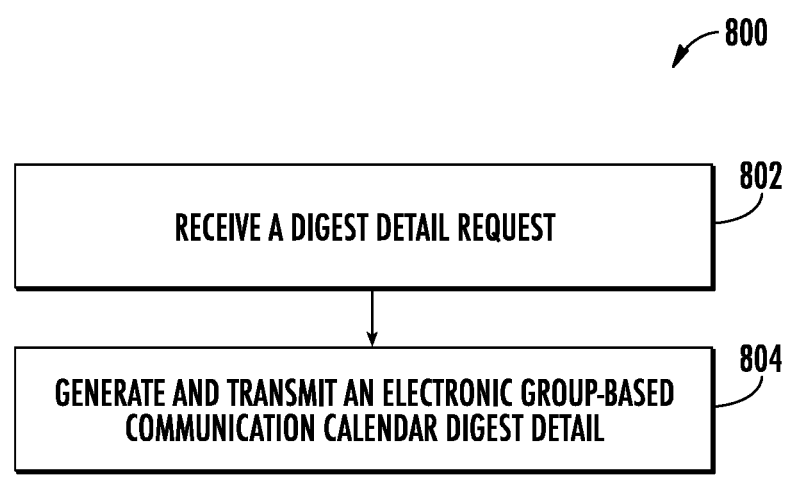
FIG. 8 illustrates a flow diagram of an example group-based communication system in accordance with some embodiments discussed herein.

When the digest detail actuator 421 is selected, a digest detail request may be initiated and result in the generation and display of a digest detail in the group-based communication interface 400. FIG. 8 illustrates a flow diagram of an example system in accordance with some embodiments discussed herein. In particular, FIG. 8 illustrates method 800 which includes receiving a digest detail request 802 and generating and transmitting an electronic group-based communication calendar digest detail 804. For instance, as shown in FIG. 5, a digest detail may include the data objects shown in the digest summary as well as more information in the electronic group-based communication calendar digest 405. FIG. 5 illustrates an example group-based communication interface 400 structured in accordance with various embodiments of the invention. The electronic group-based communication calendar digest 405 includes file identifiers 415, group-based communication channel identifiers 416, and user identifiers 417.

The electronic group-based communication calendar digest 405 also includes an email identifier 418. The email identifier 418 includes an email timestamp 420, a third party event scheduling resource recipient identifier 426, a third party event scheduling resource sender identifier 425, an email subject 423, and a portion of the body of the email 424.

In the embodiment illustrated in FIG. 5, the group-based communication interface 400 is displaying a plurality of event occurrence data structures 410 (event occurrence data structures 410a, 410b), each of which include an event occurrence timestamp 411a, 411b; an event occurrence title 412a, 412b; and one or more event occurrence invitee identifiers or event occurrence creator identifiers 414a, 414b. In the embodiment illustrated in FIG. 4, event occurrence data structures 410a, 410b each include an event occurrence location identifier 413a, 413b. In the embodiment illustrated in FIG. 5, the electronic group-based communication calendar digest 405 includes event occurrence data structure 410b. That is, in the embodiment illustrated in FIG. 5, the group-based communication system 105 found event occurrence data structure 410b to be a relevant data object for including in the electronic group-based communication calendar digest 405 for event occurrence data structure 410a. As shown in FIG. 5, event occurrence data structure 410b is related to the event occurrence title 412a of event occurrence data structure 410a. Accordingly, the group-based communication system 105 may locate and select event occurrence data structures 410 that provide relevant information to the user when preparing for events associated with other events.

Each of the components of the event occurrence data structure 410a and electronic group-based communication calendar digest 405 may be configured as user engageable links providing access to additional information regarding the respective component. For instance, the event occurrence data structure 410b may be configured as an actuator that when selected initiates a request to view the associated electronic calendar, an electronic group-based communication calendar digest for event occurrence data structure 410b, or combinations thereof. The email indicator 418 may be configured as an actuator that when selected initiates a request to view the associated email and the subsequent display of the email in the group-based communication interface 400.

Figure 9:
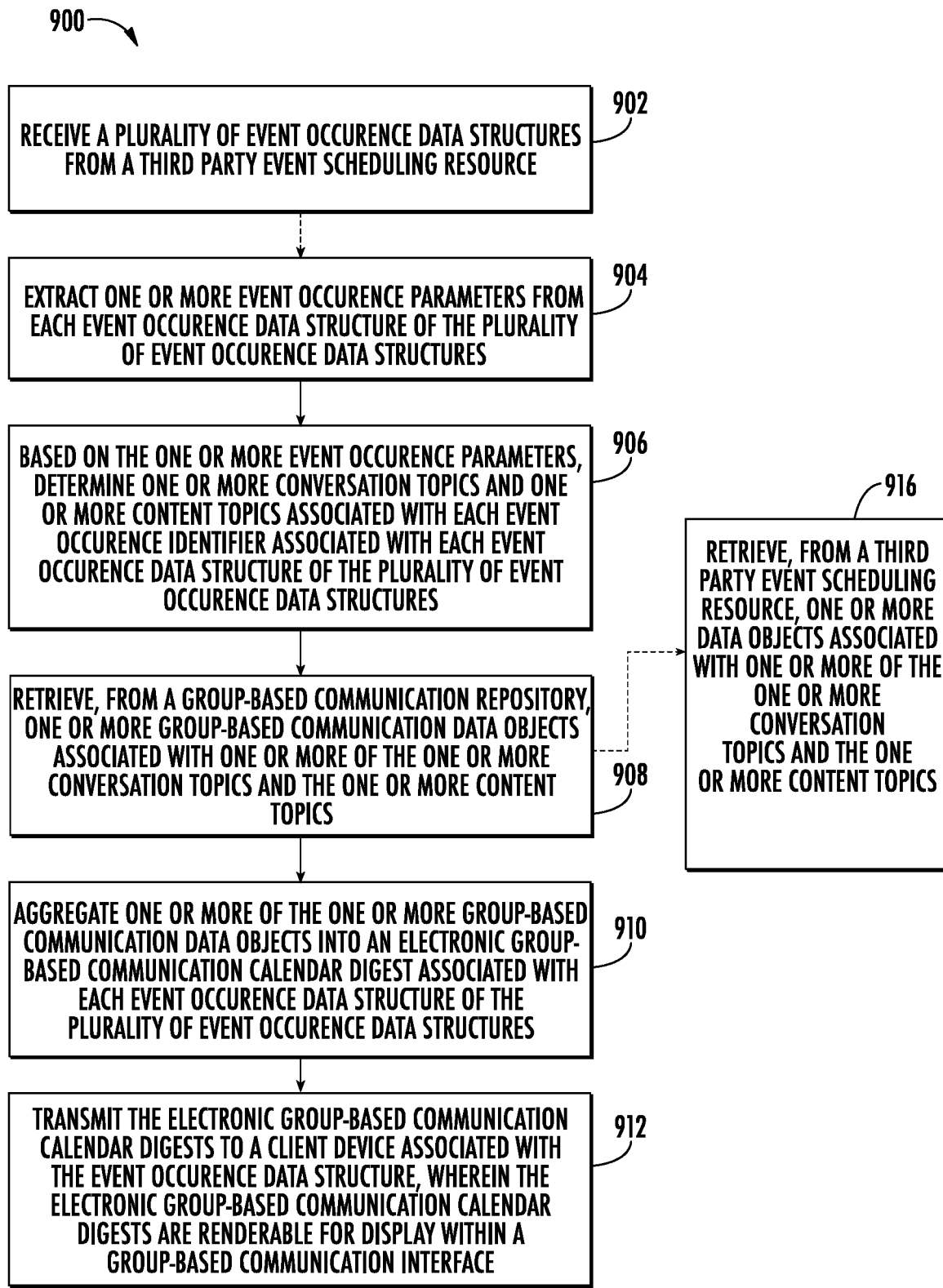
FIG. 9 illustrates a flow diagram of an example group-based communication system in accordance with some embodiments discussed herein.

In some embodiments, electronic group-based communication calendar digests may be requested for a plurality of calendar objects. FIG. 9 illustrates a flow diagram of an example system in accordance with some embodiments discussed herein. In particular, FIG. 9 illustrates method 900 which includes receiving a plurality of event occurrence data structures from a third party event scheduling resource 902; extracting one or more event occurrence parameters from each event occurrence data structure of the plurality of event occurrence data structures 904; based on the one or more event occurrence parameters, determine one or more conversation topics and one or more content topics associated with each event occurrence identifier associated with each event occurrence data structure of the plurality of event occurrence data structures 906; retrieving, from a group-based communication repository, one or more group-based communication data objects associated with one or more of the one or more conversation topics and the one or more content topics 908; aggregating one or more of the one or more group-based communication data objects into an electronic group-based communication calendar digest associated with each event occurrence data structure of the plurality of event occurrence data structures 910; and transmitting the electronic group-based communication calendar digests to a client device associated with the event occurrence data structure, wherein the electronic group-based communication calendar digests are renderable for display within a group-based communication interface 912. As shown in FIG. 9, the method 900 may also include retrieving, from a third party event scheduling resource, one or more group-based communication data objects associated with one or more of the one or more conversation topics and the one or more content topics 916.

FIG. 6, for example, illustrates a group-based communication interface 400 displaying a plurality of electronic group-based communication calendar digests in accordance with some example embodiments provided herein. In particular, FIG. 6 illustrates a collection of electronic group-based communication calendar digests where the digests are summary digests providing an abbreviated display of the selected data objects.

In the embodiment illustrated in FIG. 6, the group-based communication interface 400 is displaying a plurality of event occurrence data structures 410 (event occurrence data structures 410a, 410b), each of which include an event occurrence timestamp 411a, 411b; an event occurrence title 412a, 412b; and one or more event occurrence invitee identifiers or event occurrence creator identifiers 414a, 414b. In the embodiment illustrated in FIG. 4, event occurrence data structure 410a includes an event occurrence location identifier 413a; however, event occurrence data structure 410b does not include an event occurrence location identifier 413.

Each of the event occurrence data structures 410a, 410b is displayed along with an electronic group-based communication calendar digest 405a, 405b. As shown in FIG. 6, the electronic group-based communication calendar digest 405a, 405b include various data objects, the data objects specific to the associated event occurrence data structure 410a, 410b. Electronic group-based communication calendar digest 405a includes a file identifier 415a and user identifier 417a, both of which may be configured as a user engageable link allowing access to additional information. For instance, clicking the file identifier 415a may initiate a request to retrieve the file associated with the file identifier 415a and subsequent display of the file. Clicking either user identifier 417a may initiate a request to retrieve profile data or initiate a direct message with the user associated with the user identifier 417a.

Electronic group-based communication calendar digest 405b includes a file identifier 415b and user identifier 417b, both of which may be configured as a user engageable link allowing access to additional information. For instance, clicking the file identifier 415b may initiate a request to retrieve the file associated with the file identifier 415b and subsequent display of the file. Clicking either user identifier 417b may initiate a request to retrieve profile data or initiate a direct message with the user associated with the user identifier 417b. The user identifiers 417b include an avatar and a third party event scheduling resource user identifier ("Bob.Bell@Bell.com"). Since the third party event scheduling resource user identifier ("Bob.Bell@Bell.com") is associated with a third party event scheduling resource, clicking the third party event scheduling resource user identifier ("Bob.Bell@Bell.com") may initiate an email hosted by the third party event scheduling resource or initiate a request for any information stored on the group-based communication system regarding the user associated with the third party event scheduling resource user identifier.

The electronic group-based communication calendar digest 405b also includes an email identifier 418. The email identifier 418 includes an email timestamp 420, a third party event scheduling resource recipient identifier 426, a third party event scheduling resource sender identifier 425, an email subject 423, and a portion of the body of the email 424.

The electronic group-based communication calendar digests 405a, 405b illustrated in FIG. 6 may form a collection of electronic group-based communication calendar digests. A user may desire to receive electronic group-based communication calendar digests 405 on a periodic basis (e.g., daily, weekly, monthly, etc.) to review information regarding the upcoming events associated with a certain period of time. For instance, a collection of electronic group-based communication calendar digests may be generated and displayed on the group-based communication interface of the respective client device each morning to review the event occurrences having event occurrence timestamps for that particular day. The user may review the electronic group-based communication calendar digests to prepare for the day. Similarly, a collection of electronic group-based communication calendar digests may be generated and displayed on the group-based communication interface of the respective client device each Monday morning to review the event occurrences having time stamps for that particular week. Similarly, a collection of electronic group-based communication calendar digests may be generated and displayed on the group-based communication interface of the respective client device the first day of each month to review the event occurrences having time stamps for that particular month. The user may further identify in the digest request that the electronic group-based communication calendar digests are only generated for certain event occurrences (e.g., event occurrences with specific timestamps, creators, invitees, titles, locations, etc.). For instance, electronic group-based communication calendar digests may only be generated and displayed for event occurrences having a supervisor as an invitee, event occurrences associated with Thursdays of each week at 2:00 PM, event occurrences having "Budget Review" in the title, etc.

In the embodiments illustrated in FIGS. 4-6, various identifiers were displayed. These identifiers may be formatted in a variety of configurations with any suitable image or visual object including animated object, text, or other form to identify the associated content.

In some example embodiments, the group-based communication interface 400 may further provide, although not shown, levers, knobs, buttons, etc. arranged in one or more standard configurations to provide control of adjustable filtering parameters such as selection for the most recent content, content within a specific timespan, or a diversified set of content.

Additionally or alternatively, the data surfacing system 214 may make a recommendation of any topic or group-based communication channel to follow or create to the user based on the event occurrence data structure 410. For example, the data surfacing system 214 can make a recommendation of a channel to a user based on similarities between the data objects in the electronic group-based communication calendar digest. The data surfacing system 214 can make multiple suggestions as well as rank or order the suggestions in terms of their relevance to the user associated with the event occurrence data structures.

In some embodiments, the group-based communication system 105 may allow a client device 101A-101N to modify, delete, or store the electronic group-based communication calendar digest 405, such as by adding data objects to or removing data objects from the electronic group-based communication calendar digest 405, deleting the electronic group-based communication calendar digest 405, or saving the electronic group-based communication calendar digest 405. For instance, the electronic group-based communication calendar digest 405 may be stored in the group-based communication system 105 such that future access of the respective event occurrence data structure 410 may initiate the retrieval and display of the electronic group-based communication calendar digest 405. All or a portion of the electronic group-based communication calendar digest 405 may be stored in the group-based communication system 105 and associated with the respective event occurrence data structure 410 for future use.

In some embodiments, one or more event occurrence data structures 410 may be associated to each other (e.g., recurring events). An electronic group-based communication calendar digest 405 may be created for each event occurrence data structure 410 or may be associated with each of the associated event occurrence data structures 410 (e.g., shared among the event occurrence data structures 410). Further, the group-based communication system 105 may update electronic group-based communication calendar digest 405 prior to the timestamp associated with each associated event occurrence data structure 410 to provide an updated electronic group-based communication calendar digest 405. Client devices 101A-101N may modify the electronic group-based communication calendar digests 405 and such modifications may be applied to electronic group-based communication calendar digests 405 for each associated event occurrence data structures 410.

Figure 10:
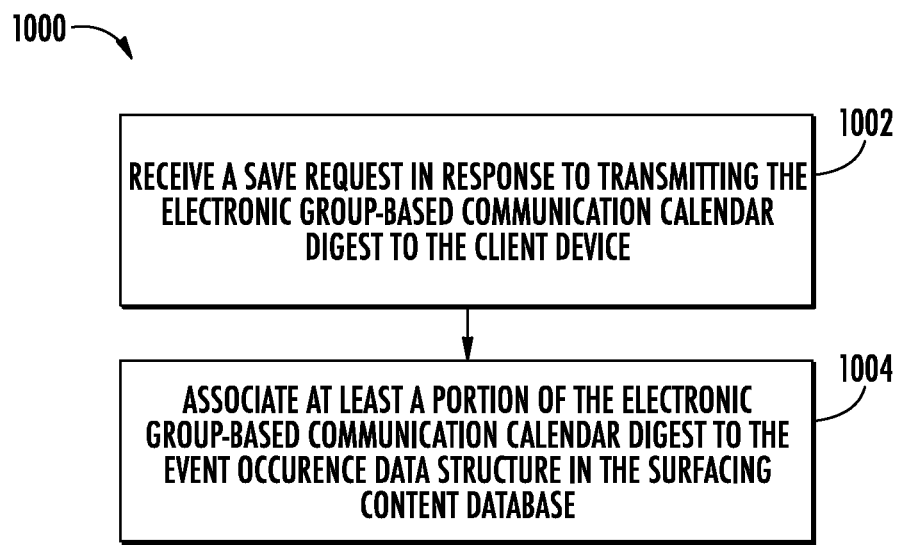
FIG. 10 illustrates a flow diagram of an example group-based communication system in accordance with some embodiments discussed herein.

FIG. 10 illustrates a flow diagram of an example system in accordance with some embodiments discussed herein. In particular, FIG. 10 illustrates method 1000 which includes receiving a save request in response to transmitting the electronic group-based communication calendar digest to the client device 1002 and associating at least a portion of the electronic group-based communication calendar digest to the event occurrence data structure in the surfacing content database 1004.

Figure 11:
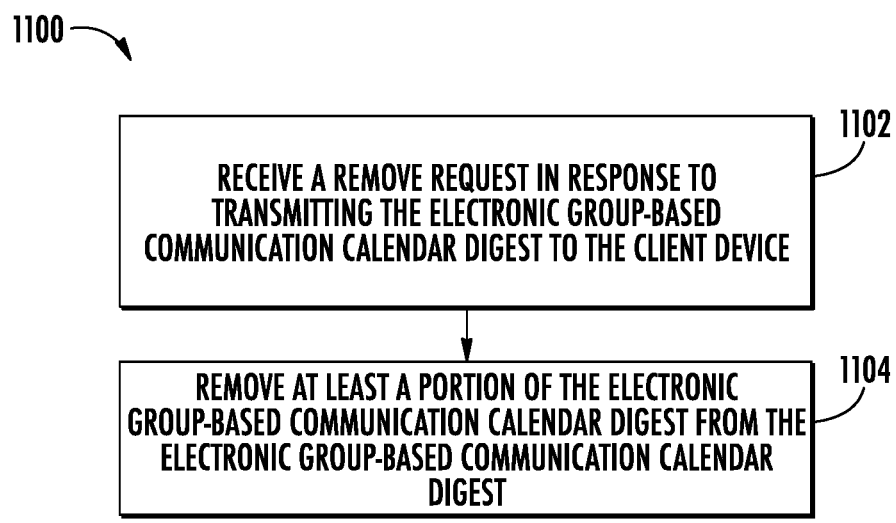
FIG. 11 illustrates a flow diagram of an example group-based communication system in accordance with some embodiments discussed herein.

FIG. 11 illustrates a flow diagram of an example system in accordance with some embodiments discussed herein. In particular, FIG. 11 illustrates method 1100 which includes receiving a remove request in response to transmitting the electronic group-based communication calendar digest to the client device 1102 and removing at least a portion of the electronic group-based communication calendar digest from the electronic group-based communication calendar digest 1104. Similarly, a client device may initiate an add request in response to transmitting the electronic group-based communication calendar digest to the client device and adding one or more data objects to the electronic group-based communication calendar digest based on the add request. For instance, a user may add a certain file, user identifier, group-based communication channel, thread, email, calendar object, etc. to the electronic communication calendar digest.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus for programmatically generating and transmitting group-based communication calendar digests to a user device associated with one or more event occurrence data structures within a group-based communication system, the apparatus comprising at least one processor and at least one memory including computer program code for one or more programs, the at least one memory and the computer program code configured to, with the at least one processor, cause the apparatus to:

receive an event occurrence data structure from a third-party event scheduling resource, wherein the event occurrence data structure is associated with an event occurrence identifier and an event occurrence start time identifier;

extract one or more event occurrence parameters from the event occurrence data structure;

based on the one or more event occurrence parameters, determine one or more conversation topics associated with the event occurrence identifier, wherein the one or more conversation topics associated with the event occurrence identifier are determined by parsing one or more text strings from a database storing a set of group-based communication conversation messages;

determine one or more content topics associated with the event occurrence identifier, wherein the one or more content topics associated with the event occurrence identifier are determined by applying a machine learning model to the one or more text strings;

retrieve, from a group-based communication repository, one or more group-based communication data objects associated with one or more of the one or more conversation topics and the one or more content topics;

in response to determining that one or more of the one or more group-based communication data objects are similar, automatically remove one or more duplicate group-based communication data objects from the one or more group-based communication data objects to reduce an amount of transmitted data;

aggregate one or more of the one or more group-based communication data objects into an electronic group-based communication calendar digest, wherein the electronic group-based communication calendar digest comprises a plurality of event associated data objects previously posted within a group-based communication channel of the group-based communication system;

transmit the electronic group-based communication calendar digest to a client device associated with the event occurrence data structure, wherein the electronic group-based communication calendar digest is renderable for display within a group-based communication interface, wherein the electronic group-based communication calendar digest is transmitted to the client device prior to a network time associated with the event occurrence start time identifier; and cause display of at least a portion of the electronic group-based communication calendar digest including indicia of the plurality of event associated data objects in the group-based communication channel within a group-based communication interface based on group-based communication channel settings, wherein the group-based communication channel is associated with a set of users who are associated with a workspace of the group-based communication system with access to the group-based communication channel.

2. The apparatus of claim 1, wherein the client device associated with the event occurrence data structure is a client device associated with an event occurrence creator identifier or an event occurrence invitee identifier.

3. The apparatus of claim 1, wherein the at least one memory and the computer program code are further configured to, with the at least one processor, cause the apparatus to:

calculate a relevance score of each of the one or more group-based communication data objects associated with one or more of the one or more conversation topics and the one or more content topics to obtain a calculated relevance score;

select and order the one or more group-based communication data objects associated with one or more of the one or more conversation topics and the one or more content topics based on the calculated relevance score; and filter the one or more group-based communication data objects associated with one or more of the one or more conversation topics and the one or more content topics to remove one or more group-based communication data objects associated with one or more of the one or more conversation topics and the one or more content topics not meeting a threshold relevance score.

4. The apparatus of claim 1, wherein the electronic group-based communication calendar digest transmitted to the client device associated with the event occurrence data structure is an electronic group-based communication calendar digest summary.

5. The apparatus of claim 4, wherein the at least one memory and the computer program code are further configured to, with the at least one processor, cause the apparatus to:

receive a digest detail request, and in response to receipt of the digest detail request, generate and transmit an electronic group-based communication calendar digest detail.

6. The apparatus of claim 1, wherein the event occurrence parameters further comprises an event occurrence title, event occurrence timestamp, event occurrence invitee identifier, or combinations thereof.

7. The apparatus of claim 1, wherein the event occurrence data structure is associated with a group-based communication system and comprises a group-based communication channel identifier, thread identifier, group identifier, or combinations thereof.

8. The apparatus of claim 1, wherein the at least one memory and the computer program code are further configured to, with the at least one processor, cause the apparatus to:

receive a digest request associated with the event occurrence data structure along with receiving the event occurrence data structure, the digest request indicating a time period for transmitting the electronic group-based communication calendar digest.

9. The apparatus of claim 1, wherein the electronic group-based communication calendar digest is transmitted to the client device at a predetermined time prior to the network time associated with the event occurrence start time identifier.

10. The apparatus of claim 5, wherein the digest detail request is configured to cause the apparatus to periodically:

identify a plurality of event occurrence data structures from the third-party event scheduling resource;

extract one or more event occurrence parameters from each event occurrence data structure of the plurality of event occurrence data structures;

based on the one or more event occurrence parameters, determine one or more conversation topics and one or more content topics associated with each event occurrence identifier associated with each event occurrence data structure of the plurality of event occurrence data structures;

retrieve, from a group-based communication repository, one or more group-based communication data objects associated with one or more of the one or more conversation topics and the one or more content topics;

aggregate one or more of the one or more group-based communication data objects into an electronic group-based communication calendar digest associated with each event occurrence data structure of the plurality of event occurrence data structures; and transmit the electronic group-based communication calendar digests to the client device associated with the event occurrence data structure.

11. The apparatus of claim 1, wherein the at least one memory and the computer program code are further configured to, with the at least one processor, further cause the apparatus to:

retrieve, from the third-party event scheduling resource, one or more data objects from the third-party event scheduling resource associated with one or more of the one or more conversation topics and the one or more content topics; and add the one or more data objects to the electronic group-based communication calendar digest.

12. The apparatus of claim 1, wherein the one or more group-based communication data objects comprises a file, a group-based communication channel, a thread, a communication message, a user identifier, a second event occurrence data structure, an email, or combinations thereof.

13. The apparatus of claim 11, wherein the one or more data objects from the third-party event scheduling resource comprises a file, a second event occurrence data structure, an email, or combinations thereof.

14. The apparatus of claim 1, wherein the at least one memory and the computer program code are further configured to, with the at least one processor, further cause the apparatus to:

receive a save request in response to transmitting the electronic group-based communication calendar digest to the client device, and in response to receiving the save request, associate at least a portion of the electronic group-based communication calendar digest to the event occurrence data structure in a surfacing content database.

15. The apparatus of claim 1, wherein the at least one memory and the computer program code are further configured to, with the at least one processor, further cause the apparatus to:

receive a remove request in response to transmitting the electronic group-based communication calendar digest to the client device, and in response to receiving the remove request, remove at least a portion of the electronic group-based communication calendar digest from the electronic group-based communication calendar digest, transmit the electronic group-based communication calendar without the portion of the electronic group-based communication calendar digest, or combinations thereof.

16. The apparatus of claim 1, wherein the at least one memory and the computer program code are further configured to, with the at least one processor, further cause the apparatus to:

receive an add request in response to transmitting the electronic group-based communication calendar digest to the client device; and in response to receiving the add request, add one or more data objects to the electronic group-based communication calendar digest based on the add request and transmit the electronic group-based communication calendar digest with the one or more data objects.

17. The apparatus of claim 1, wherein the electronic group-based communication calendar digest is renderable for di splay within a group-based communication channel of the group-based communication interface.

18. The apparatus of claim 1, wherein the electronic group-based communication calendar digest is renderable for display within a thread of the group-based communication interface.

19. The apparatus of claim 1, wherein the one or more of the one or more group-based communication data objects in the electronic group-based communication calendar digest are displayed as one or more user engageable links associated with each of the one or more of the one or more group-based communication data objects to provide access to relevant information regarding each associated group-based communication data object.

20. The apparatus of claim 19, wherein at least one of the one or more user engageable links is configured to cause the display of a file, a group-based communication channel, a thread, a communication message, a second event occurrence data structure, an email, or combinations thereof.

\* \* \* \* \*